(12) United States Patent
Yardi et al.

(10) Patent No.: US 12,032,839 B2
(45) Date of Patent: Jul. 9, 2024

(54) HIERARCHICAL POWER MANAGEMENT OF MEMORY FOR ARTIFICIAL REALITY SYSTEMS

(71) Applicant: Meta Platforms Technologies, LLC, Menlo Park, CA (US)

(72) Inventors: Shrirang Madhav Yardi, San Jose, CA (US); Gregory Edward Ehmann, Sleepy Hollow, IL (US); Ennio Salemi, Palo Alto, CA (US); George Spatz, Lake Zurich, IL (US); Jeffrey Ryden, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 71 days.

(21) Appl. No.: 16/947,432

(22) Filed: Jul. 31, 2020

(65) Prior Publication Data

US 2022/0004328 A1  Jan. 6, 2022

Related U.S. Application Data

(60) Provisional application No. 63/047,035, filed on Jul. 1, 2020.

(51) Int. Cl.
*G06F 3/06* (2006.01)
*G06F 1/28* (2006.01)
(Continued)

(52) U.S. Cl.
CPC .............. *G06F 3/0634* (2013.01); *G06F 1/28* (2013.01); *G06F 3/0625* (2013.01); *G06F 3/064* (2013.01);
(Continued)

(58) Field of Classification Search
CPC ........ G06F 3/0634; G06F 1/28; G06F 3/0625; G06F 3/064; G06F 3/0673; G06F 3/011;
(Continued)

(56) References Cited

U.S. PATENT DOCUMENTS 5,655,127 A * 8/1997 Rabe ..................... G06F 1/3287
710/48
8,127,153 B2   2/2012 Kapil
(Continued)

OTHER PUBLICATIONS

U.S. Appl. No. 16/506,618, filed Jul. 9, 2019, by Atlas et al.
(Continued)

*Primary Examiner* — Jaweed A Abbaszadeh
*Assistant Examiner* — Brian J Corcoran
(74) *Attorney, Agent, or Firm* — Greenberg Traurig, LLP

(57) ABSTRACT

The disclosure describes techniques for hierarchical power management of memory of an artificial reality system to reduce power consumption by the memory. An example device may be a peripheral device configured to generate artificial reality content for display or a head-mounted display unit (HMD) configured to output artificial reality content for display. The device includes memory divided into multiple memory blocks configurable to operate in a plurality of power modes. The device also includes memory block controllers controlling memory blocks. Each memory block controller controls which power mode in which the corresponding memory block is to operate, independent of any of the other memory blocks. The device includes a memory power controller configured to configure control registers of the memory block controllers to direct the memory block controllers to select one of the plurality of power modes for the memory blocks when the memory blocks are not being accessed.

16 Claims, 12 Drawing Sheets

(51) Int. Cl.
*G06T 19/00* (2011.01)
*G06F 3/01* (2006.01)

(52) U.S. Cl.
CPC .......... *G06F 3/0673* (2013.01); *G06T 19/006* (2013.01); *G06F 3/011* (2013.01)

(58) Field of Classification Search
CPC ........ G06F 1/32; G06F 1/3234; G06F 1/3275; G06F 1/3287; G06T 19/006
See application file for complete search history.

(56) References Cited

U.S. PATENT DOCUMENTS

| | | | |
|---|---|---|---|
| 9,916,104 B2 | 3/2018 | Jayachandran et al. | |
| 2008/0320203 A1* | 12/2008 | Fitzgerald | G06F 12/0292 |
| | | | 711/E12.082 |
| 2014/0298056 A1* | 10/2014 | Seki | G06F 1/3275 |
| | | | 713/320 |
| 2016/0110299 A1* | 4/2016 | Sheafor | G06F 1/3296 |
| | | | 710/18 |
| 2017/0220094 A1 | 8/2017 | Ozawa | |
| 2017/0365305 A1 | 12/2017 | Chang et al. | |
| 2018/0284874 A1* | 10/2018 | Sundararajan | G06F 1/3275 |
| 2019/0079575 A1 | 3/2019 | Hanson et al. | |
| 2019/0094949 A1* | 3/2019 | Kurian | G06F 1/3296 |
| 2020/0084387 A1* | 3/2020 | Baldwin | H04N 5/33 |
| 2021/0064113 A1* | 3/2021 | Laurent | G11C 11/2293 |
| 2021/0064119 A1* | 3/2021 | Mirichigni | G11C 8/12 |
| 2021/0157390 A1* | 5/2021 | Yardi | G06F 3/013 |

OTHER PUBLICATIONS

International Search report and Written Opinion for International Application No. PCT/US2021/038832, mailed Oct. 15, 2021, 10 pages.

International Preliminary Report on Patentability for International Application No. PCT/US2021/038832, mailed Jan. 12, 2023, 8 pages.

* cited by examiner ial Reality Systems

HIERARCHICAL POWER MANAGEMENT OF MEMORY FOR ARTIFICIAL REALITY SYSTEMS

This application claims the benefit of U.S. Provisional Application No. 63/047,035, filed Jul. 1, 2020, the entire contents of which are herein incorporated by reference.

TECHNICAL FIELD

In general, this disclosure relates to power management of memory of artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. These devices are often battery powered. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes techniques for hierarchical power management of memory in artificial reality (AR) systems to reduce power consumption by the memory. The artificial reality system may include different devices (e.g. a head mounted display, a peripheral device, etc.) that cooperate to provide the AR experience. These devices include one or more Systems-on-a-Chip (SoCs) that include subsystem to provide various functionalities for the AR system. These SoCs include memory, such as static random-access memory (SRAM), that is used by the subsystems to provide the functionalities. In some examples, the memory is divided into memory blocks that can be configured to operate in different power modes independently of each other. These power modes include a high power mode (e.g., an operating mode) in which the memory addresses associated with the memory block can be accessed, and one or more low power modes (e.g., a retention mode, a power off mode, a nap mode, etc.) in which power consumption is lower than the high power mode and addresses associated with the memory block cannot be accessed.

In techniques described below, the power modes of these memory blocks are controlled in a hierarchical manner. A RAM domain controller (RDC) (an example of and sometimes referred to as a "memory power controller") implements software-based and hardware-based control of multiple RAM domain blocks (RDBs) (examples of and sometimes referred to as "memory block controllers"). The power mode of each memory block is controlled by a corresponding RDB. With the RDCs and the RDBs, a power management system of an SoC may apply fine or coarse power control over the memory of the SoC. The RDBs each include a state machine that is controlled via an event input and control registers and/or signal lines. The RDBs may operate with hardware control and/or software control. The event input provides for coarse hardware control of the memory power modes, while the control registers provide for more fine-grained control of the memory power states. The RDB controls the power mode of the associated memory block based on the current state of the state machine. The current state of the state machine is based on the signal on the event input and the content of the control registers or the values of the signal lines. As used herein, hardware control refers to controlling the RDBs based on signals generated by components of the memory hardware (e.g., a memory decoder, etc.) in the process of memory access. As used herein, software control refers to controlling the RDBs via (a) signal inputs and/or control registers by the RDC based on input received from, for example, firmware operating on the SoCs and/or operating in power management circuitry and/or (b) signal inputs into software registers from firmware operating on the SoCs and/or operating in power management circuitry. The techniques may provide one or more technical advantages that realize one or more practical applications. The hierarchical control structure of RDCs and RBDs facilitate flexibility in controlling power modes at various granularities of, for example, the SRAM of the system (e.g., from individual memory blocks to larger memory "chunks"). For example, fine-grained control of the power consumption of memory using both hardware (e.g., via the event line) and software (e.g., via the control registers) controls may reduce power consumption of the artificial reality system. Providing hardware and software control of memory in this manner provides greater customization and control of memory while improving latency in transitioning memory between power modes. This may prolong battery life and improve responsiveness for artificial reality systems and improve a user experience.

An example artificial reality system includes a device. The device may be a peripheral device configured to generate artificial reality content for display or a head-mounted display unit (HMD) configured to output artificial reality content for display. The device includes memory divided into multiple memory blocks each configurable to operate in a plurality of power modes independently of each other, one or more memory block controllers for corresponding memory blocks, and a memory power controller. Each memory block controller is controls, based on a control register of the memory block controller, which one of the plurality of power modes in which the corresponding memory block is to operate, independent of any of the other memory blocks. The memory power controller configures respective control registers of the memory block controllers to direct the memory block controllers to select one of the plurality of power modes for the memory blocks when the memory blocks are not being accessed.

An example method for hierarchical power control of memory in an artificial reality system includes controlling, by a first memory block controller, which one of a plurality of power modes in which a first memory block is to operate. The memory is divided into the first memory block and a second memory block that are configurable to operate in a plurality of power modes independently of each other. The method also includes controlling, independent of the first memory block, by a second memory block controller, which one of the plurality of power modes in which the second memory block is to operate. Additionally, the method includes controlling, by a memory power controller, respective control registers of the first and second memory block controllers to direct the first and second memory block controllers to select one of the plurality of power modes for the first and second memory blocks when the first and second memory blocks are not being accessed.

An examples computer readable medium comprising instructions that, when executed, cause a memory power management system of an artificial reality system to control, with a first memory block controller, which one of a plurality of power modes in which a first memory block is to operate, the memory being divided into the first memory block and a second memory block that are configurable to operate in a plurality of power modes independently of each other. The instructions further cause the memory power management system to control, independent of the first memory block, with a second memory block controller, which one of the plurality of power modes in which the second memory block is to operate. Additionally, the instructions cause the memory power management system to control respective control registers of a first and second memory block controllers respectively coupled to the first and second memory blocks to select one of the plurality of power modes for the first and second memory blocks when the first and second memory blocks are not being accessed.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the text and figures.

DETAILED DESCRIPTION

Figure 1A:
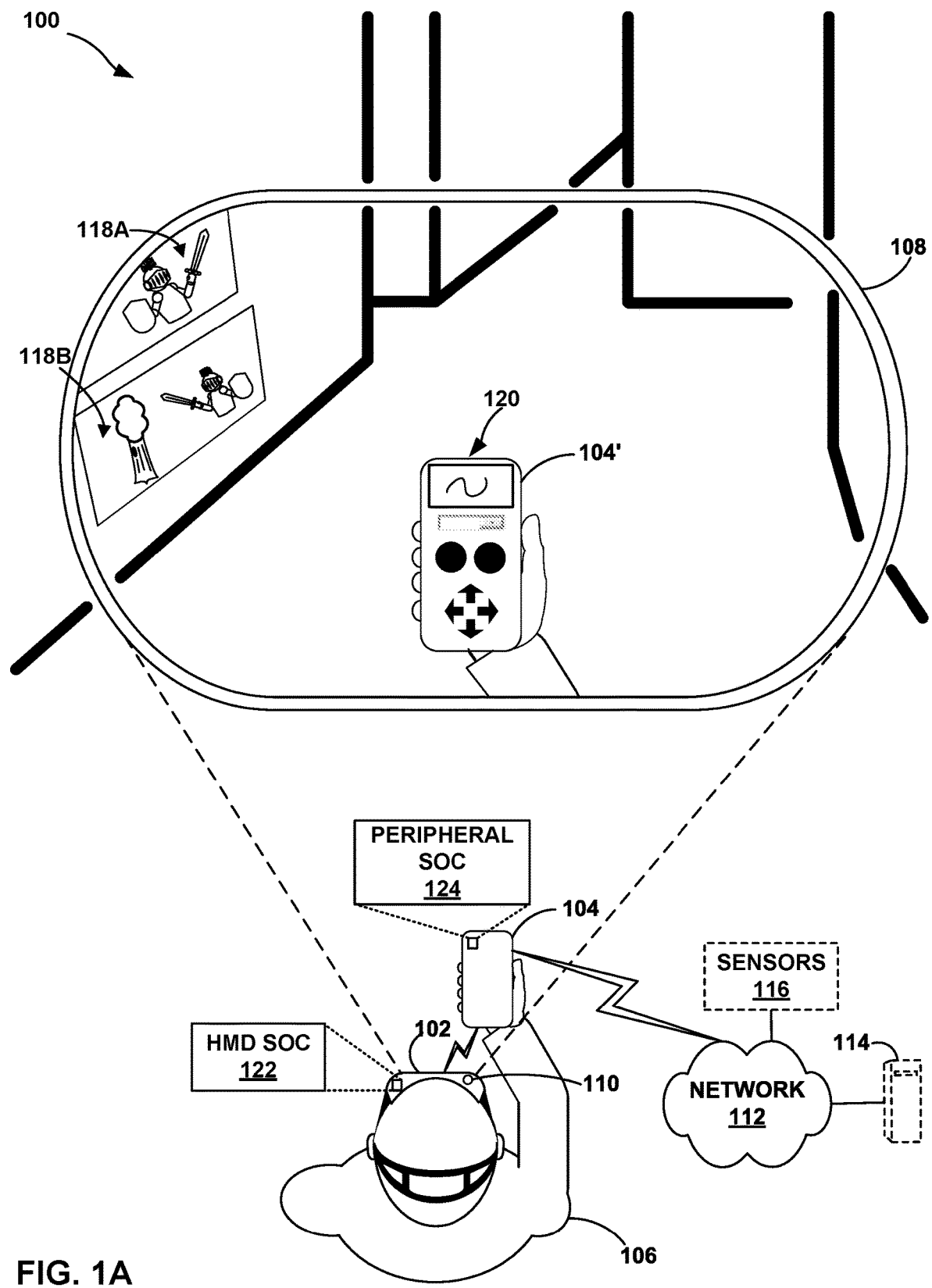
FIG. 1A is an illustration depicting an example multi-device artificial reality system that enables hierarchical power management of random-access memory, in accordance with the techniques described in this disclosure.

Power management of random-access memory (RAM) can increase usage between charges of a battery-operated system. RAM supports discrete power modes that have different power consumption characteristics, such as (i) an operating (OPR) mode in which the memory is accessible, (ii) a nap (NAP) node in which the clock is disabled, (iii) a retention (REN) mode in which the integrity of stored data is maintained but the supply voltage is below that specified for reading or writing to memory and the clock is disabled, and/or (iv) an power down (PSO) mode in which supply voltage is reduced such that integrity of stored data is not maintained. Transitioning between modes require may require a delay as supply voltage and the clock is supplied to the memory to be accessed. Generally, memory is read in bursts (e.g., a period of high read/write activity followed by a period of low activity) and sequentially. As such, different parts of memory can be selectively placed in different power modes depending on their usage scenario to provide a tradeoff between power consumed and performance delivered by the memory.

As used herein, a "power mode" describes the operating conditions (e.g., a supply voltage, a driving clock frequency, etc.) of a memory block. For example, a high power mode may describe a power mode wherein the memory block is receiving a supply voltage and a driving clock frequency sufficient to enable read and write access to the memory block and where the power consumption associated with the memory block is relatively high compared to other power modes. As another example, a low power mode may describe a power mode wherein the memory block is receiving supply power and/or a driving clock frequency such that memory block performance is degraded and/or the memory block is inaccessible and where power consumption associated with the memory block is relatively lower than the high power mode. As used here, a "power state" refers to a state of a state machine that causes the memory block to be operated in a corresponding power mode.

In a mixed reality system, different devices (e.g. a head mounted display, a peripheral device, etc.) that cooperate to provide the mixed reality experience. These devices include one or more Systems-on-a-Chip (SoCs) that include random-access memory (RAM) (e.g., static RAM (SRAM), etc.) to support the functionality of the corresponding SoC. The memory is organized into a hierarchical structure to facilitate broad power management policy while supporting more granular power control to reflect the usage scenarios of the memory. Memory may be organized into one or more segments that may be control (e.g., by an SoC power management circuit) to operate, for example, in a default power state when not being access. For example, a 10 Mb memory may be divided into 10 1 Mb memory segments. In such an example, the SoC power management circuit may power up some segments while other remain off. Some segments may default to a NAP state while other segments default to a REN state. Memory segments may be divided into memory blocks that are capable of operating in power modes independently of each other. For example, a 1 Mb memory segment may be divided into 16 64 kb memory blocks. Through software and/or hardware control, the memory blocks may be placed into the OPR state when accessed and placed into the default power state when not accessed. Memory power modes can be directly controlled by direct software inputs to the memory (e.g., direct software control). However, his direct software control is often slow (e.g., compared to the hierarchical structure described below). For example, the direct software control to determine which individual memory blocks to change to which power modes and addressing the individual memory blocks to place in the designated power mode requires software overhead that may cause delay. This may result in increased memory access delays or increased number of memory blocks that need to be power on at one time to reduce the impact of the memory access delays.

As described below, the power mode of memory of an SoC is controlled by a memory power manager (sometimes referred to as a "cluster manager") which may be part of a power management circuit that also, for example, manages power states of subsystems of the SoC. Memory segments are control by a RAM domain controller (RDC) (sometimes referred to as a "memory power controller"). Memory blocks are controlled by RAM domain blocks (RDBs) (examples of and sometimes referred to as "memory block controllers"). The memory power manager may control multiple RDC, which may in turn control multiple RDBs. With the RDCs and the RDBs, the memory power manager may apply fine or course power control over the SRAM of the SoC in a hierarchical manner. This hierarchical structure with indirect software control combined with the hardware control facilitates a system setting power modes for different granularities of memory depending on system requirements while the memory is not being accessed, and implementing those power modes upon access to the memory (via the hardware control). This may facilitate faster memory access for the memory blocks that need to be accessed without substantially slowing memory access or powering more memory blocks than necessary. Thus, the RDCs and RDBs may provide reduced access times and/or more targeted memory access compared to direct software control.

The memory power manager may institute a power control policy that, for example complements a power management state of the mixed reality system. For example, the memory management and/or power management subsystems may determine that certain memory blocks are more frequently accessed than others. In such a scenario, the RDC may use the control registers associated with the frequently accessed memory blocks so that the RDB puts them into one low power mode when not accessed. The RDC may use the control registers associated with the less frequently accessed memory blocks so that the RDB puts them into another low power mode when not accessed. The RDC writes to the control registers and/or operates signal lines of the RDBs to control the power modes of the corresponding memory blocks. In some examples, when the RDBs operate using software control, the RDC controls the power state of the memory block via the corresponding RDBs using the RDBs control registers and/or signal lines (e.g., the RDC causes state transitions via the control registers and/or signal lines). For example, when a subsystem of the SoC proactively indicates that a certain memory block is going to be accessed, the RDC may use to the control registers and/or signal lines to transition the RDB from the RET state to the OPR state. Additionally or alternatively, when the RDBs operate using hardware control, the RDC use the control registers and/or signal lines to proscribe what state the corresponding memory block enters after being accessed (e.g., the RDC controls the low power state to which the RDB transitions to from the OPR state). For example, the RDC may control the RDBs to return to the RET state after hardware ceases to cause the RDB to be in the OPR state.

The RDBs each include a state machine, an event input, and control registers and/or signal lines. The control registers and/or signal lines are communicatively coupled to the RDC. The event input is communicatively coupled to a memory decoder. The RDB controls the power mode of the associated memory block based on the current state of the state machine. The current state of the state machine is based on the signal on the event input and/or the content of the control registers or the values of the signal lines. The RDB may operate with hardware control (state transition triggered by event line) and/or software control (state transition triggered by control registers). For example, an event signal on the event line may cause the state machine to transition to an OPR state. This causes the RDB to supply voltage and a clock signal to the memory block to enable access to memory addresses associated with that memory block. When the event signal ceases, the contents of the control register may cause the state machine to transition to the RET states, which causes the RDB to lower the supply voltage and disable the clock for that memory block.

FIG. 1A is an illustration depicting a multi-device artificial reality system 100 that includes head-mounted device (HMD) 102 and peripheral device 104. As shown, HMD 102 is typically worn by user 106, and includes an electronic display and optical assembly for presenting artificial reality content 108 to user 106. In addition, HMD 102 includes one or more sensors (e.g., accelerometers) for tracking motion of HMD 102. HMD 102 may include one or more image capture devices 110, e.g., cameras, line scanners, fundal photography hardware, or the like. Image capture devices 110 may be configured for capturing image data of the surrounding physical environment. In some examples, image capture devices 110 include inward-facing camera hardware and/or scanning hardware configured to capture facial images, retina scans, iris scans, etc. of user 106 for user authentication and for other purposes. HMD 102 is shown in this example as being in communication with (e.g., in wireless communication with or tethered to) peripheral device 104. Peripheral device 104 represents a co-processing device in communication with HMD 102. HMD 102 and/or peripheral device 104 may execute an artificial reality application to construct artificial reality content 108 for display to user 106. For example, HMD 102 and/or peripheral device 104 may construct the artificial reality content based on tracking pose information and computing pose information for a frame of reference, typically a viewing perspective of HMD 102.

As shown in FIG. 1A, one or more devices of multi-device artificial reality system 100 may be connected to a computing network, such as network 112. Network 112 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 112 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 100 or coupled to multi-device artificial reality system 100 via network 112. The optional nature of these devices is shown in FIG. 1A by way of dashed-line borders. One example of an optional device shown in FIG. 1A is console 114. In implementations that include console 114, console 114 may communicate with peripheral device 104 (and thereby, indirectly with HMD 102) to process artificial reality content that HMD 102 outputs to user 106. Another example of optional hardware shown in FIG. 1A is represented by external sensors 116. Multi-device artificial reality system 100 may use external sensors 116 and/or external camera hardware to capture three-dimensional (3D) information within the real-world, physical environment at which user 8 is positioned.

In general, multi-device artificial reality system 100 uses information captured from a real-world, 3D physical environment to render artificial reality content 108 for display to user 106. In the example of FIG. 1A, a user 106 views the artificial reality content 108 constructed and rendered by an artificial reality application executing on the combination of HMD 102 and peripheral device 104. In some examples, artificial reality content 108 may comprise a combination of real-world imagery (e.g., peripheral device 104 in the form of peripheral device representation 104', representations of walls at the physical environment at which user 106 is presently positioned, a representation of the hand with which user 106 holds peripheral device 104, etc.) overlaid with virtual objects (e.g., virtual content items 118A and 118B, virtual user interface 120, etc.) to produce an augmented reality experience or a mixed reality experience displayed to user 106 via display hardware of HMD 102.

In some examples, virtual content items 118A and 118B (collectively, virtual content items 118) may be mapped to a particular position within artificial reality content 108. As examples, virtual content items 118 may be pinned, locked, or placed to/at certain position(s) within artificial reality content 108. A position for a virtual content item may be fixed, as relative to one of the walls of the real-world imagery reproduced in artificial reality content 108, or to the earth, as examples. A position for a virtual content item may be variable, as relative to peripheral device representation 104' or to the tracked gaze or field of view (FoV) of user 106, as non-limiting examples. In some examples, the particular position of a virtual content item within artificial reality content 108 is associated with a position within the real-world, physical environment (e.g., on a surface of a physical object) at which user 106 is positioned presently.

In this example, peripheral device 104 is a physical, real-world device having a surface on which the artificial reality application executing on computing platforms of multi-device artificial reality system 100 overlays virtual user interface 120. Peripheral device 104 may include one or more presence-sensitive surfaces for detecting user inputs by detecting a presence of one or more objects (e.g., fingers, stylus) touching or hovering over locations of the presence-sensitive surface. In some examples, peripheral device 104 may include one or more output devices, such as a display integrated into the presence-sensitive surface to form an input/output (I/O) component of peripheral device 104.

In some examples, peripheral device 104 may have the form factor of various portable devices, such as a smartphone, a tablet computer, personal digital assistant (PDA), or other handheld device. In other examples, peripheral device 104 may have the form factor of various wearable devices, such as a so-called "smartwatch," "smart ring," or other wearable device. In some examples, peripheral device 104 may be part of a kiosk or other stationary or mobile system. While described above as integrating display hardware, peripheral device 6 need not include display hardware in all implementations.

In the example artificial reality experience shown in FIG. 1A, virtual content items 118 are mapped to positions on a visual representation of a wall of the real-world physical environment at which user 106 is positioned. The example in FIG. 1A also shows that virtual content items 118 partially appear on the visual representation of the wall only within artificial reality content 108, illustrating that virtual content items 118 do not represent any items that exist in the real-world, physical environment at which user 106 is positioned. Virtual user interface 120 is mapped to a surface of peripheral device 104 as represented in peripheral device representation 104'. Multi-device artificial reality system 100 renders virtual user interface 120 for display via HMD 102 as part of artificial reality content 108, at a user interface position that is locked relative to the position of a particular surface of peripheral device 104.

FIG. 1A shows that virtual user interface 120 appears overlaid on peripheral device representation 104' (and therefore, only within artificial reality content 108), illustrating that the virtual content represented in virtual user interface 120 does not exist in the real-world, physical environment at which user 8 is positioned. Multi-device artificial reality system 100 may render one or more virtual content items in response to a determination that at least a portion of the location of virtual content items is in the FoV of user 106. For example, multi-device artificial reality system 100 may render virtual user interface 120 on peripheral device 104 only if peripheral device 104 is within the FoV of user 106.

Various devices of multi-device artificial reality system 100 may operate in conjunction in the artificial reality environment, such that each device may be a separate physical electronic device and/or separate integrated circuits within one or more physical devices. In this example, peripheral device 104 is operationally paired with HMD 102 to jointly operate to provide an artificial reality experience. For example, peripheral device 104 and HMD 102 may communicate with each other as co-processing devices. As one example, when a user performs a user interface-triggering gesture in the virtual environment at a location that corresponds to one of the virtual user interface elements of virtual user interface 120 overlaid on peripheral device representation 104', multi-device artificial reality system 100 detects the user interface and performs an action that is rendered and displayed via HMD 102.

In accordance with techniques described of this disclosure, each of peripheral device 104 and HMD 102 may include one or more SoC integrated circuits configured to support aspects of the artificial reality application described above, such as SoCs operating as co-application processors, encryption engines, decryption engines, sensor aggregators, display controllers, etc. Although each of peripheral device 104 and HMD 102 may include multiple SoCs, FIG. 1A only illustrates HMD SoC 122 of HMD 102 and peripheral SoC 124 of peripheral device 104, for ease of illustration and discussion. To facilitate functionality of the device (e.g., peripheral device 104, HMD 102), the SoCs 122 and 124 include memory, such as RAM. Either or both of SoCs 122 and 124 may operate power management techniques to reduce power consumption, including power consumption of memory.

For example, a memory of SoC 122 (for instance) may be divided into one or more memory segments. For example, 10 Mb of memory may be divided into 10 1 Mb memory segments. Each of the memory segments are associated with a different RDC. Each memory segment is divided into memory blocks capable of independently operating in different power modes. For example, each 1 Mb memory segment may be divided into 64 kb memory blocks. Each of the memory blocks is associated with a different RDB. The RDC of the memory segment is coupled to the RDBs of the associated memory blocks to control the states of state machines of the RDB. When a subsystem of the SoC 122 accesses a memory address associated with one of the memory blocks, the corresponding RDB transitions to an OPR state to provide supply voltage sufficient to allow read and write access. The subsystem may read the data from several memory addresses. When the subsystem no longer requires access to the memory address (e.g., its read operation is complete, it begins to access memory addresses associated with a different memory block, etc.), the state machine of the RDB transitions to a lower power state (e.g., the NAP state, the REN state, the PSO state, etc.) according to the power control instructions provided by the associated RDC (e.g., via control registers or signal lines).

In this way, SoCs 122, 124 may provide hierarchical power management in which RDBs provide independent fine-grained control over memory blocks based, e.g., on memory accesses to the memory blocks, while RDCs may provide coarse-grained control over multiple different RDBs (and corresponding memory blocks) based, e.g., on demands from software executing on the artificial reality system. This may reduce power consumption by the memory in the system to prolong battery life and improve a user experience.

Figure 1B:
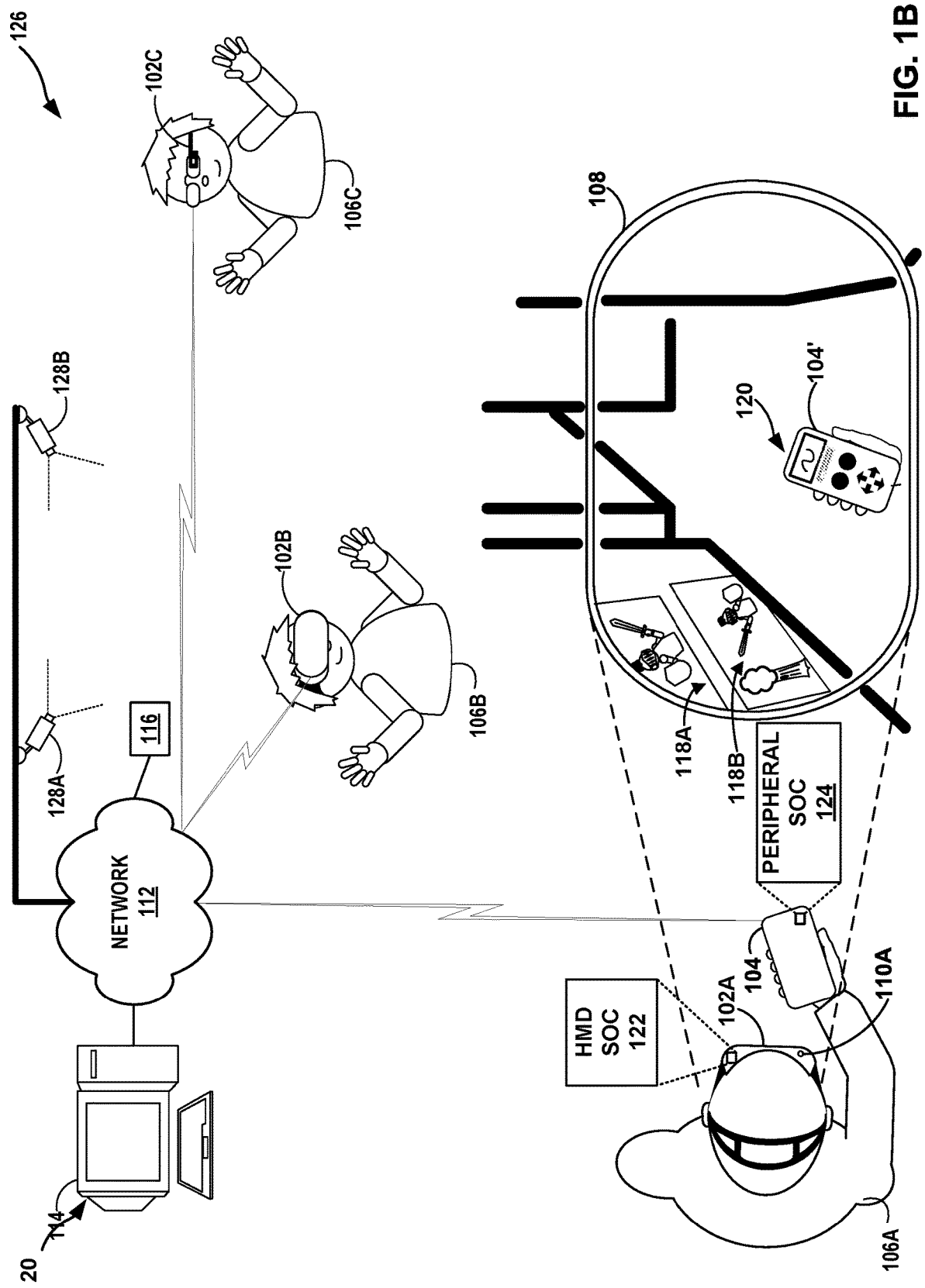
FIG. 1B is an illustration depicting an example artificial reality system that enables hierarchical power management of random-access memory, in accordance with techniques described in this disclosure.

FIG. 1B is an illustration depicting another example multi-device artificial reality system 126. In the example of FIG. 1B, multi-device artificial reality system 126 includes external cameras 128A and 128B (collectively, "external cameras 28"), HMDs 102A-102C (collectively, "HMDs 102"), console 114, and sensors 116. As shown in FIG. 1B, multi-device artificial reality system 126 represents a multi-user environment in which an artificial reality application executing on console 114 and/or HMDs 102 presents artificial reality content to each of users 106A-106C (collectively, "users 106") based on a current viewing perspective of a corresponding frame of reference for the respective user 106. That is, in this example, the artificial reality application constructs artificial reality content by tracking and computing pose information for a frame of reference for each of HMDs 102. Multi-device artificial reality system 126 uses data received from external cameras 128 and/or HMDs 102 to capture 3D information within the real-world environment, such as motion by users 106 and/or tracking information with respect to users 106, for use in computing updated pose information for a corresponding frame of reference of HMDs 102.

HMDs 102 operate concurrently within multi-device artificial reality system 126. In the example of FIG. 1B, any of users 106 may be a "player" or "participant" in the artificial reality application, and any of users 106 may be a "spectator" or "observer" in the artificial reality application. HMDs 102 of FIG. 1B may each operate in a substantially similar way to HMD 102 of FIG. 1A. For example, HMD 102A may operate substantially similar to HMD 102 of FIG. 1A, and may receive user inputs by tracking movements of the hands of user 106A. HMD 102A includes integrated image capture device 110A.

Each of HMDs 102 implements a respective user-facing artificial reality platform (or co-implements the platform with a co-processing device, as in the case of HMD 102A with peripheral device 104), and outputs respective artificial content, although only artificial reality content 108 output by HMD 102A is shown in FIG. 1B, purely for the purpose of ease of illustration. As shown in FIG. 1B, two or more of HMDs 102 may, but need not necessarily, conform to the same form factor. Various form factors of HMDs 102 are shown in FIG. 1B, including a goggle form factor and an eyeglass form factor. In some use case scenarios, HMDs 102B and/or 102C may also be paired (e.g. wirelessly coupled or tethered to) a portable device that implements generally corresponding features to those described with respect to peripheral device 104.

Similar to the example described in FIG. 1A, HMD 102C (or any of HMDs 102) may include a wireless communication system that improves the performance of encryption and decryption operations when sending or receiving encrypted packets from HMD SoC 122 to peripheral SoC 124.

In accordance with techniques of this disclosure, each of HMD SoC 122 and peripheral SoC 124 includes multiple subsystems, with each subsystem being dedicated to supporting certain functionalities, such as audio processing for the artificial reality experience, moving picture processing for the artificial reality experience, security information for user 106 or others, etc. As described above, the SoCs 122 and 124 include RDCs and RDBs to provide hierarchical power management of memory as these subsystems access the memory.

Figure 2:
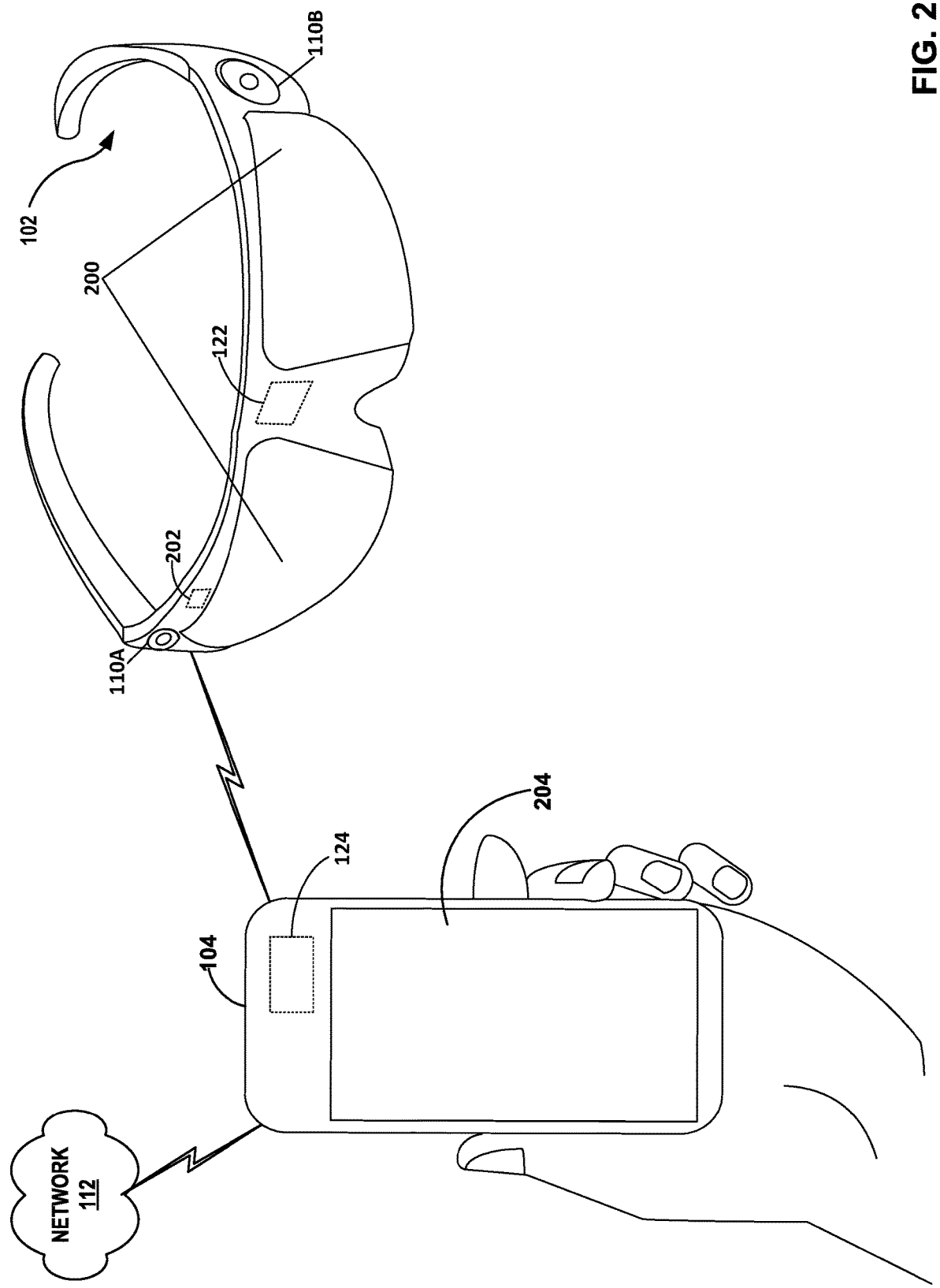
FIG. 2 is an illustration depicting an example HMD and an example peripheral device that enables sec hierarchical power management of random-access memory, in accordance with techniques described in this disclosure.

FIG. 2 is an illustration depicting an example of HMD 102 in communication with peripheral device 104 In this example, HMD 102 includes a front rigid body and two stems to secure HMD 102 to user 106 e.g., by resting over the ears of user 106. In addition, HMD 102 includes an interior-facing electronic display 200 configured to present artificial reality content to user 106. Electronic display 200 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, electronic display 200 includes a stereoscopic display for providing separate images to each eye of user 106. In some examples, the known orientation and position of display 200 relative to the front rigid body of HMD 102 is used as a frame of reference, also referred to as a local origin, when tracking the position and orientation of HMD 102 for rendering artificial reality content according to a current viewing perspective of HMD 102 and user 106.

HMD 102 takes the form factor of eyeglasses in the example of FIG. 2. In some examples, electronic display 200 may be split into multiple segments, such as into two segments, with each segment corresponding to a separate lens disposed on the rigid front body of HMD 102. In other examples in accordance with FIG. 2, electronic display 200 may form a contiguous surface that spans both lenses and the lens-connecting bridge (i.e., the over-the-nose portion) of the rigid front body of HMD 102. In some examples in accordance with the form factor illustrated in FIG. 2, electronic display 200 may also encompass portions of HMD 102 that connect the lenses of the front rigid body to the stems, or optionally, portions of the stems themselves. These various designs of electronic display 200 in the context of the form factor of HMD 102 shown in FIG. 2 improve accessibility for users having different visual capabilities, eye movement idiosyncrasies, etc. In other examples, HMD 102 may take other form factors, such as the general form factor of a headset or goggles equipped with a band to secure HMD 102 to the head of user 106.

In the example illustrated in FIG. 2, HMD 102 further includes one or more motion sensors 202, such as one or more accelerometers (also referred to as inertial measurement units or "IMUS") that output data indicative of current acceleration of HMD 102, GPS sensors that output data indicative of a location of HMD 102, radar, or sonar that output data indicative of distances of HMD 102 from various objects, or other sensors that provide indications of a location or orientation of HMD 102 or other objects within a physical environment. In the example illustrated in FIG. 2, HMD 102 includes integrated image capture devices 110A and 110B (collectively, "image capture devices 110"). Image capture devices 110 may include still image camera hardware, video camera hardware, laser scanners, Doppler® radar scanners, fundus photography hardware, infrared imaging cameras, depth scanners, or the like. Image capture devices 110 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 102, such as, but not limited to, the real-world environment at which user 106 is positioned. Inward-facing camera hardware of image capture devices 14 may capture image data of wearer of HMD 102, such as facial images and/or retina scans and/or temperature information of user 106.

Again HMD 102 is in communication with example peripheral device 104 in the example of FIG. 2. Peripheral device 104 may be communicatively coupled to HMD 102 in a number of ways, such as over a wireless communication links (e.g., Wi-Fi™, near-field communication of short-range wireless communication such as Bluetooth®, etc.) or a wired communication link or tethered connection, or any combination thereof. Peripheral device 104 may receive and send data over network 112, and may thereby function as a network interface of the artificial reality system that includes or is formed by the combination peripheral device 104 with HMD 102. Surface 204 of peripheral device 104 represents an input component or a combined input/output component of peripheral device 104. Surface 204 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 204 may enable peripheral device 6 to receive touch input or gesture input without direct contact with surface 204. User 106 may provide these touch or gesture inputs to peripheral device 104 to provide instructions directly to peripheral device 104, or indirectly to HMD 102 and/or other components of an artificial reality system in which HMD 102 is deployed. In some examples, processing circuitry of HMD 102 may utilize image capture devices 110 to analyze configurations, positions, movements, and/or orientations of peripheral device 104, of the hand(s) or digit(s) thereof of user 106 to enable to provide input using gestures such as drawing gestures or typing gestures provided via a graphical keyboard.

In this way, peripheral device 104 may offload various hardware and resource burdens from HMD 102, which enables low-profile form factor designs of HMD 102. Peripheral device 104 may also serve as a communications intermediary between HMD 102 and devices at remote locations, via network 112. Additional details of peripheral device 104 are described in U.S. patent application Ser. No. 16/506,618 (filed on 9 Jul. 2019), the entire content of which is incorporated herein by reference.

In accordance with techniques of this disclosure, one or both of peripheral device 104 and HMD 102 may include one or more SoC integrated circuits configured to support aspects of the artificial reality application described above, such as SoCs operating as co-application processors, encryption engines, decryption engines, sensor aggregators, display controllers, etc. Additionally, each of HMD SoC 122 and peripheral SoC 124 may include one or more subsystems, with each subsystem being dedicated to supporting certain functionalities, such as audio processing, image and frame processing, security management, wireless communication, etc. Each of HMD SoC 122 and peripheral SoC 124 include memory (e.g., shared memory) to facilitate operation and cooperation of the subsystems. As described above, the SoCs 122 and 124 include RDCs and RDBs to provide hierarchical power management for the memory.

Figure 3:
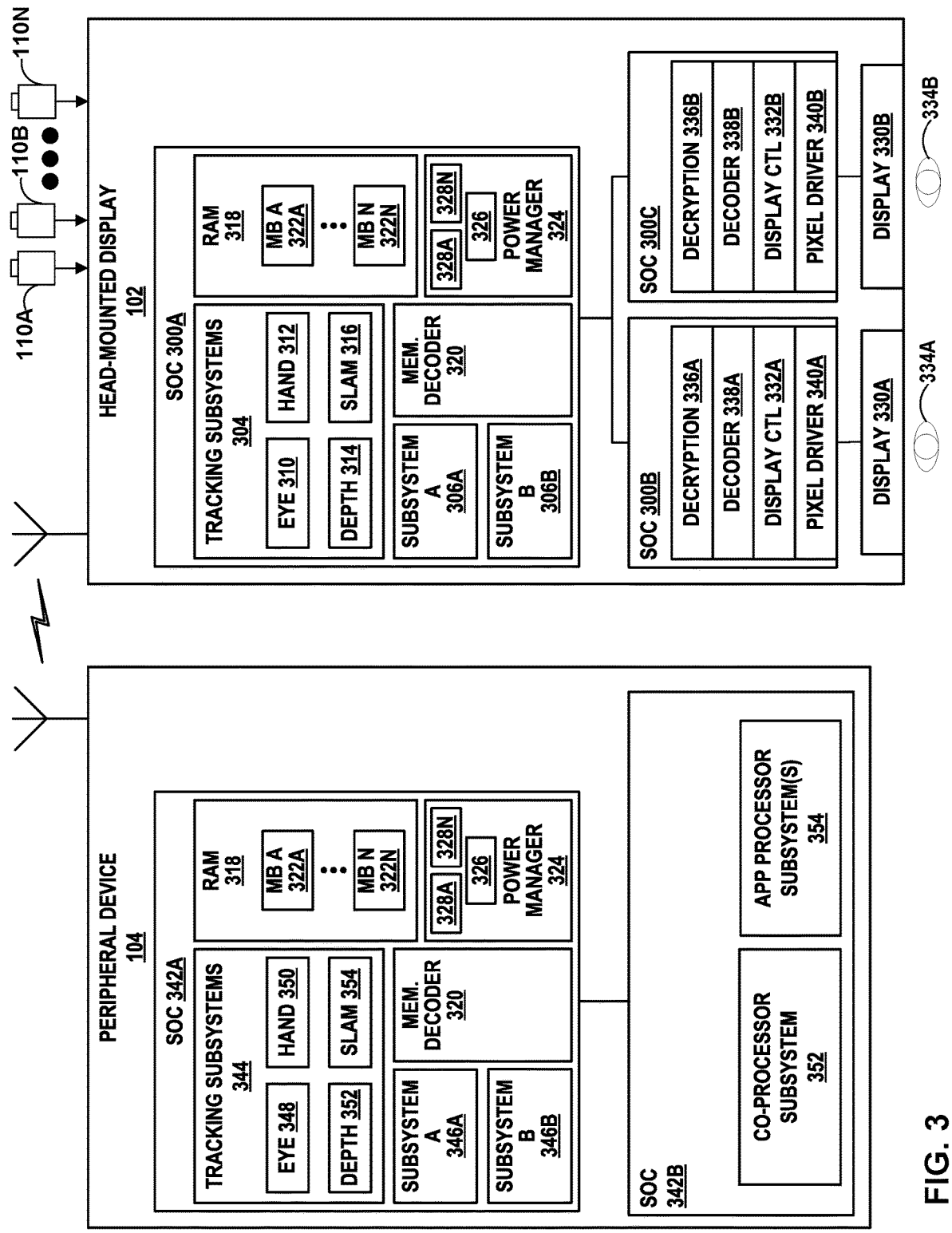
FIG. 3 is a block diagram illustrating an example implementation of a distributed architecture for a multi-device artificial reality system in which one or more devices are implemented using one or more system on a chip (SoC) integrated circuits within each device and having hierarchical power management of random-access memory, in accordance with techniques described in this disclosure.

FIG. 3 is a block diagram illustrating a more detailed example implementation of a distributed architecture for a portion of multi-device artificial reality systems 100 or 126, in which two or more devices are implemented using respective SoC integrated circuits within each device. FIG. 3 illustrates an example in which HMD 102 operating in conjunction with peripheral device 104. Again, peripheral device 104 represents a physical, real-world device having a surface on which multi-device artificial reality systems 100 or 126 overlay virtual content. Peripheral device 104 may include one or more presence-sensitive surface(s) 204 for detecting user inputs by detecting a presence of one or more objects (e.g., fingers, stylus, etc.) touching or hovering over locations of presence-sensitive surfaces) 204. In some examples, peripheral device 104 may have a form factor similar to any of a smartphone, a tablet computer, a personal digital assistant (PDA), or other hand-held device. In other examples, peripheral device 104 may have the form factor of a smartwatch, a so-called "smart ring," or other wearable device. Peripheral device 104 may also be part of a kiosk or other stationary or mobile system. As described above, HMD 102 is architected and configured to enable the execution of artificial reality applications.

In general, the SoCs illustrated in FIG. 3 represent a collection of specialized integrated circuits arranged in a distributed architecture, where each SoC integrated circuit includes various specialized functional blocks configured to provide an operating environment for artificial reality applications. FIG. 3 is merely one example arrangement of SoC integrated circuits. The distributed architecture for a multi-device artificial reality system may include any collection and/or arrangement of SoC integrated circuits.

In this example, SoC 300A of HMD 102 comprises functional blocks including tracking subsystems 304, and various other subsystems 306A and 306B. The subsystems 304, 306A, and 306B are groups of integrated circuits that provide one or more defined functions to the SoC 300A. SoC 300A may be an example instance of HMD SoC 122.

As one example, tracking subsystems 304 provides functional blocks for eye tracking 310, hand tracking 312, depth tracking 314, and/or Simultaneous Localization and Mapping (SLAM) 316. For example, HMD 102 may receive input from one or more accelerometers (also referred to as inertial measurement units or "IMUs") that output data indicative of current acceleration of HMD 102, GPS sensors that output data indicative of a location of HMD 102, radar or sonar that output data indicative of distances of HMD 102 from various objects, or other sensors that provide indications of a location or orientation of HMD 102 or other objects within a physical environment. HMD 102 may also receive image data from one or more image capture devices 110. Image capture devices 110 may include video cameras, laser scanners, Doppler radar scanners, depth scanners, or the like, configured to output image data representative of the physical environment. More specifically, image capture devices capture image data representative of objects (including peripheral device 104 and/or hand) in the physical environment that are within a field of view of image capture devices, which typically corresponds with the viewing perspective of HMD 102. Based on the sensed data and/or image data, tracking subsystem 304 determines, for example, a current pose for the frame of reference of HMD 102 and, in accordance with the current pose, renders the artificial reality content.

Subsystems 306A and 306B provide specialized functions for HMD 102. Subsystems 306A and 306B may include, for example, security processing, graphics processing, an interface processing, audio processing, and/or display processing, etc. Security processing subsystem may provide secure device attestation and mutual authentication of when pairing peripheral device 104 with devices, e.g., HMD 102, used in conjunction within the AR environment. For example, a security processing subsystem may authenticate one or more of the SoCs of peripheral device 104. A graphics processing subsystem may include various processors such as a video processing unit, graphics processing unit, digital signal processors, encoders and/or decoders, etc. to process surface and texture data received from the peripheral device 104. An interface processing subsystem may, for example, process signals generated by the tracking subsystem 304 and/or the image capture device 104 to provide gesture recognition to provide a gesture-based interface to the user 106. An audio processing subsystem may, for example, include codecs and/or drivers to process and output sound to audio output devices incorporated in HMD 102. A display processing subsystem may, for example, provide an interface for communicating texture and surface data between SoCs of HMD 102.

In accordance with techniques described herein, SoC 300A includes random-access memory (RAM) 318. In some examples, RAM 318 is shared memory where the subsystems 304, 306A, and 306B are each communicatively coupled to RAM 318 through a data bus (which may be a "Network-on-a-Chip" or "NoC") via a memory decoder 320. RAM 318 is divided into memory blocks (MB) 322A-322N. Memory blocks 322A-322N may be grouped together into memory segments. For simplicity, in the illustrated example, memory blocks 322A-322N are in a single memory segment. Memory blocks 322A-322N are capable of being in different power modes. Each memory block 322A-322N is associated with a sequential block of memory addresses. When a subsystem 304, 306A, and 306B access (e.g., performs a read or write action) a memory address, the memory decoder 320 uses multiple bits within the address to determine which memory block 322A-322N is to be accessed.

SoC 300A includes a power manager 324. Power manager 324 implements power management technique to control power consumption of SoC 300A, including subsystems 304, 306A, and 306B and RAM 318. In the illustrated example, to control power consumption of RAM 318, power manager 324 includes a RAM domain controller (RDC) 326 and RAM domain blocks (RDBs) 328A-328N. While the illustrated example includes one RDC 326, power manager 324 may include one RDC 326 per memory segment. As described in more detail below, RAM domain blocks (RDBs) 328A-328N control the power mode of an associated one of memory blocks 322A-322N. RDC 326 controls associated ones of RDBs 328A-328N.

SoCs 300B and 300C (sometimes referred to as the "display SoCs") each represents display controllers for outputting artificial reality content on respective displays, e.g., displays 330A and 330B (collectively, "displays 330"). In this example, display SoC 300B may include a display controller 332A for display 330A to output artificial reality content for a left eye 334A of a user (e.g., user 106 of FIGS. 1A and 1B) in conjunction with a decryption block 336A, a decoder block 338A, and/or a pixel driver 340A for outputting artificial reality content on display 330A. Similarly, display SoC 300C may include a display controller 332B for display 330B to output artificial reality content for a right eye 334B of the user in conjunction with a decryption block 336B, a decoder block 338B, and/or a pixel driver 340B for generating and outputting artificial reality content on display 330B. Displays 330 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content. While not shown, SoCs 300B and 300C may include memory and a power manager just as SoC 300A.

Peripheral device 104 includes SoCs 342A and 342B configured to support an artificial reality application. In this example, SoC 342A comprises functional blocks including tracking subsystem 344, and various other subsystems 346A and 346B. The subsystems 344 and 346A and 346B are groups of integrated circuits that provide one or more defined functions to the SoC 342A. SoC 342A may be an example instance of peripheral SoC 124.

Tracking subsystem 344 is a functional block providing eye tracking 348, hand tracking 350 depth tracking 352, and/or Simultaneous Localization and Mapping (SLAM) 354. For example, peripheral device 104 may receive input from one or more accelerometers (also referred to as inertial measurement units or "IMUs") that output data indicative of current acceleration of peripheral device 104, GPS sensors that output data indicative of a location of peripheral device 104, radar or sonar that output data indicative of distances of peripheral device 104 from various objects, or other sensors that provide indications of a location or orientation of peripheral device 104 or other objects within a physical environment. Peripheral device 104 may in some examples also receive image data from one or more image capture devices, such as video cameras, laser scanners, Doppler radar scanners, depth scanners, or the like, configured to output image data representative of the physical environment. Based on the sensed data and/or image data, tracking subsystem 336 determines, for example, a current pose for the frame of reference of peripheral device 104 and, in accordance with the current pose, renders the artificial reality content to HMD 102.

Subsystems 346A and 346B provide specialized functions for peripheral device 104. Subsystems 346A and 346B may include, for example, a security processing subsystem, a display subsystem, a graphics subsystem, and/or an audio subsystem. A security processing subsystem may authenticate one or more of the SoCs of HMD 102. A graphics processing subsystem may include various processors such as a video processing unit, graphics processing unit, digital signal processors, encoders and/or decoders, etc. to process surface and texture data received from SoC 342B. An interface processing subsystem may, for example, process signals generated by the tracking subsystem 344 and/or the interface 204. An audio processing subsystem may, for example, include digital signal processors, encoders and/or decoders, etc. to process sound to be transmitted to HMD 102. A display processing subsystem may, for example, provide an interface for communicating texture and surface data between SoCs of peripheral device 104.

In accordance with techniques described herein, and similar to SoC 300A described above, SoC 342A includes random-access memory (RAM) 318. In some examples, RAM 318 is shared memory where the subsystems 344, 346A, and 346B are each communicatively coupled to RAM 318 through a data bus (which may be a "Network-on-a-Chip" or "NoC") via a memory decoder 320. RAM 318 is divided into memory blocks (MB) 322A-322N. Memory blocks 322A-322N may be grouped together into memory segments. For simplicity, in the illustrated example, memory blocks 322A-322N are in a single memory segment. Memory blocks 322A-322N are capable of being in different power modes. Each memory block 322A-322N is associated with a sequential block of memory addresses. When a subsystem 304, 306A, and 306B access (e.g., performs a read or write action) a memory address, the memory decoder 320 uses multiple bits within the address to determine which memory block 322A-322N is to be accessed.

SoC 342A includes a power manager 324. Power manager 324 implements power management technique to control power consumption of SoC 342A, including subsystems 344, 346A, and 346B and RAM 318. In the illustrated example, to control power consumption of RAM 318, power manager 324 includes a RAM domain controller (RDC) 326 and RAM domain blocks (RDBs) 328A-328N. While the illustrated example includes one RDC 326, power manager 324 may include one RDC 326 per memory segment. As described in more detail below, RAM domain blocks (RDBs) 328A-328N control the power mode of an associated one of memory blocks 322A-322N. RDC 326 controls associated ones of RDBs 328A-328N.

SoC 342B includes one or more application co-processors 352 and one or more application processors 354. In this example, co-application processors 350 includes various processors, such as a vision processing unit (VPU), a graphics processing unit (GPU), and/or central processing unit (CPU). Application processors 352 may include a processing unit for executing one or more artificial reality applications to generate and render, for example, a virtual user interface to a surface of peripheral device 104 and/or to detect gestures performed by a user with respect to peripheral device 104. While not shown, SoC 342B may include memory and a power manager just as SoC 342A.

Figure 4:
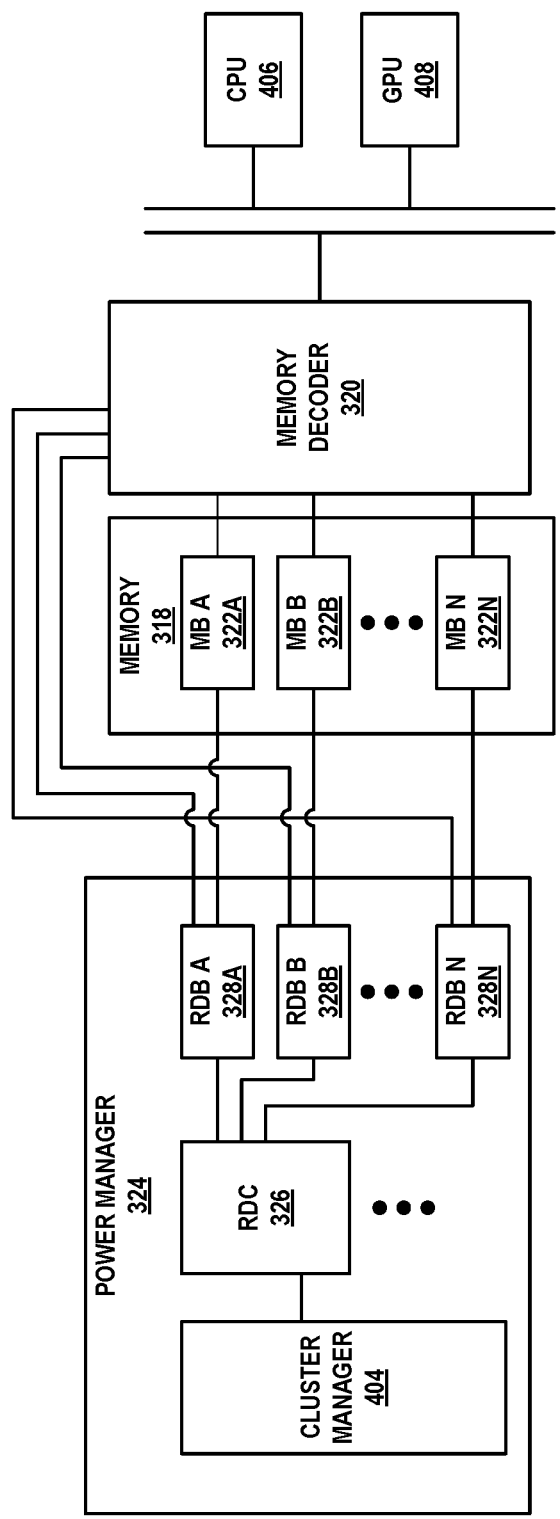
FIG. 4 is a block diagram of a hierarchical power management system, in accordance with techniques described in this disclosure.

FIG. 4 is a block diagram of a hierarchical power management system 400, in accordance with techniques described in this disclosure. In the illustrated example, hierarchical power management system 400 includes power manager 324, memory 318 and memory decoder 320. Power manager 324 includes one RDC 326 per memory segment 402 and one RDB 328A-328N per memory block 322A-322N. As described below, RDC 326 is communicatively coupled to RDBs 328A-328N associated with memory blocks 322A-322N in the corresponding memory segment 402. RDBs 328A-328N control the power mode of their associated memory block 322A-322N. In some examples, RDBs 328A-328N control the power mode by varying the supply voltage and/or clock signal to the memory blocks 322A-322N.

In some examples, power manager 324 includes a cluster manager 404. Cluster manager 404 includes communicatively couples to one or more RDCs 326 to implement power management techniques in conjunction with out power management systems, such as power domain controllers (PDCs) that control power to subsystems (e.g., subsystems 304, 306A, and 306B, etc.). In some examples, cluster manager 404 controls which subset of low power states the RDC 326 can enable. Additionally or alternatively, in some examples, cluster manager 404 may request that the RDC 326 may place one or more of the RDBs 328A-328N into an OPR state.

In some examples, memory decoder 320 is communicatively coupled to event lines of RDBs 328A-328N. When an application processor (CPU) 406 or graphical processor (GPU) 408 of one of the subsystems (e.g., subsystems 304, 306A, and 306B, etc.) requests to read or write to one of memory blocks 322A-322N via a data bus 410, memory decoder 320 may send a signal on the event line of the corresponding one of RDBs 328A-328N for the duration of the read/write access. For example, if GPU 408 request to read from sequential addresses associated with memory block A 322A, memory decoder 320 may provide a signal (e.g., a voltage level corresponding to a logical "enable") to the event line of RDB A 328A for the duration of the access by GPU 408. In such a scenario, when hardware control is enabled (e.g., by RDC 326), RDB A 328A may transition to an OPR state.

Figure 5A:
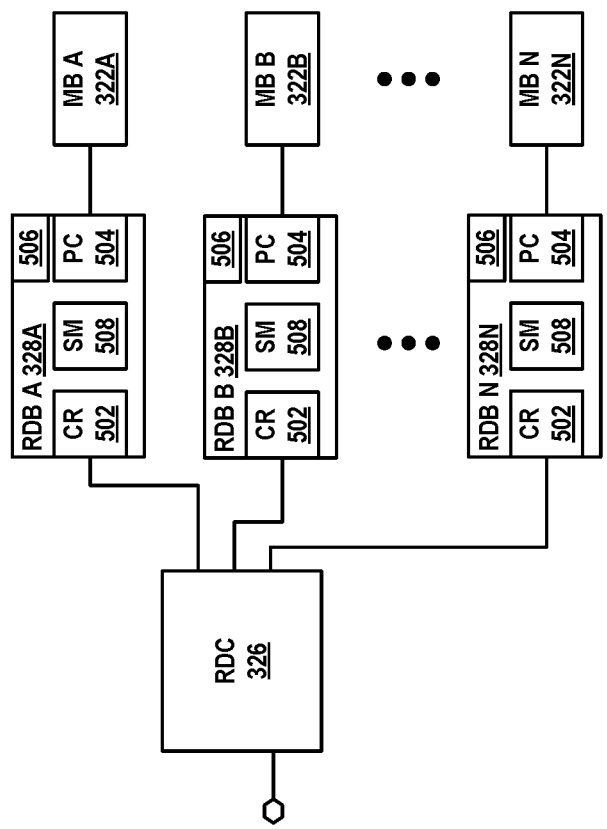
FIGS. 5A, 5B, and 5C are a block diagrams of aspects of the hierarchical power management system of FIG. 4 in further detail, in accordance with techniques described in this disclosure.
Figures 5B, 5C:
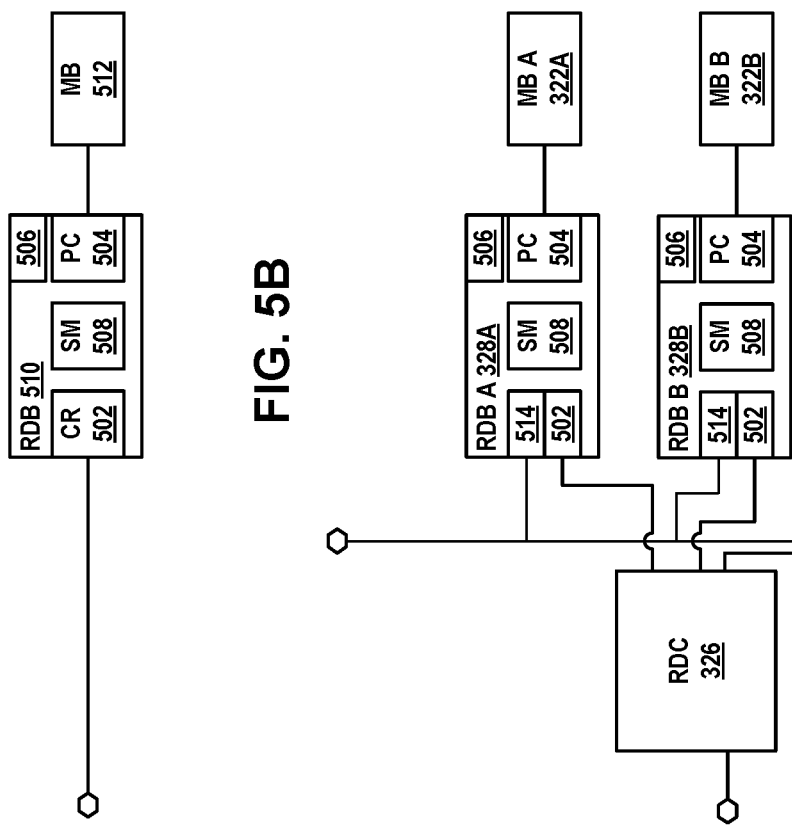

FIGS. 5A, 5B, and 5C are a block diagrams of aspects of the hierarchical power management system of FIG. 4 in further detail, in accordance with techniques described in this disclosure. In the illustrated example of FIG. 5A, RDBs 328A-328N include control registers (CR) 502, a power control (PC) 504, an event input 506, and a state machine 508. Control registers 502 receive input from RDC 326 to control the functionality of RDBs 328A-328N. In some examples, control registers 502 may each include one or more logical switches or signal inputs that, when cleared or set, set a default low power state of state machine 508, cause a transition of the state machine 508, and/or enable, disable, and/or configure modes of the RDB 328A-328N. For example, RDC 326 may write data to control registers 502 to enable or disable hardware control, set the default low power state to the REN state, and/or cause the state machine 508 to transition to the OPR state. Power control 504 controls supply voltage (e.g., via a local domain block (LDB) controlling supply voltage to memory block 322A-322N, etc.) and/or clock frequency of the associated memory block 322A-322N according to the current state of state machine. Event input 506 receives a signal (e.g., an enable signal) when memory decoder 320 decodes a memory address that is associated with the corresponding memory block 322A-322N for the duration of the access. As described below, the enable signal on event line 506 may transition state machine 508 into the OPR states.

State machine 508 transitions between states based on inputs from control registers 502 and/or the signal on event line 506. State machine 508 may receive inputs from control registers 502, which may include (i) an OPR register to provide software input to transition to OPR state 602, (ii) a NAP register to provide software input to NAP state 604, (iii) an REN register to provide software input to transition to REN state 606, (iv) a PSO register to provide input to transition to PSO state 608, (v) a PSO-OPR transition timer control register to specify a delay threshold, (vi) a REN-OPR transition timer control register to specify a delay threshold, (vii) a PSO transition timer control register to specify a delay threshold, and (viii) a REN transition timer control register to specify a delay threshold. Control registers 502 may include an SDC enable register to enable or disable transitioning to one or more states (e.g., the OPR state, etc.) based on input from other control registers (e.g., the an OPR register, etc.). In some examples, control registers 502 may include registers to provide input from cluster manager 404 (e.g., a CM-OPR register, a CM-REN register, etc.) and a CM enable register to enable or disable transitioning to one or more states (e.g., the OPR state, etc.) based on input from CM-associated registers control registers (e.g., the an CM-OPR register, etc.).

The illustrated example of FIG. 5B includes RDB 510 communicatively coupled to MB 512. RDB 510 may be an example of RDB 328 of FIG. 3. In the illustrated example, RDB 510 is directly communicatively coupled to a power management system (such as management cluster 404 of FIG. 4) without being connected to an SDC. For example, some SoCs may have limited amounts of memory and/or may have limited physical space to place circuitry related to memory management. In such examples, the SoC may still benefit from at least some of the software and hardware control provided the hierarchical power management while operating within available space.

In the illustrated example of FIG. 5C, RDBs 328A-328N include control CR 502, PC 504, event input 506, state machine 508, and software register 514. Software register 514 receives input from software operating on the SoC to control the functionality of RDBs 328A-328N. For example, software operating on the SoC may write to software register 514 to, for example, to set the default low power state and/or cause state machine 508 to transition to the OPR state, etc. In some examples, control registers 502 may include a software enable register to control when RDB 328 may implement the controls in software register 514. Additionally, in some examples, RDB 328 may coordinate with RDC 326 such that when a command is received by software register 514, the command latches until the command is implements and not allowing any other software control during the transition. In some example, if commands in software register 514, control registers 502, and event input 506 conflict, RDB 328 may prioritize event input 506, control registers 502, and then software register 514 to resolve the conflict.

Figure 6A:
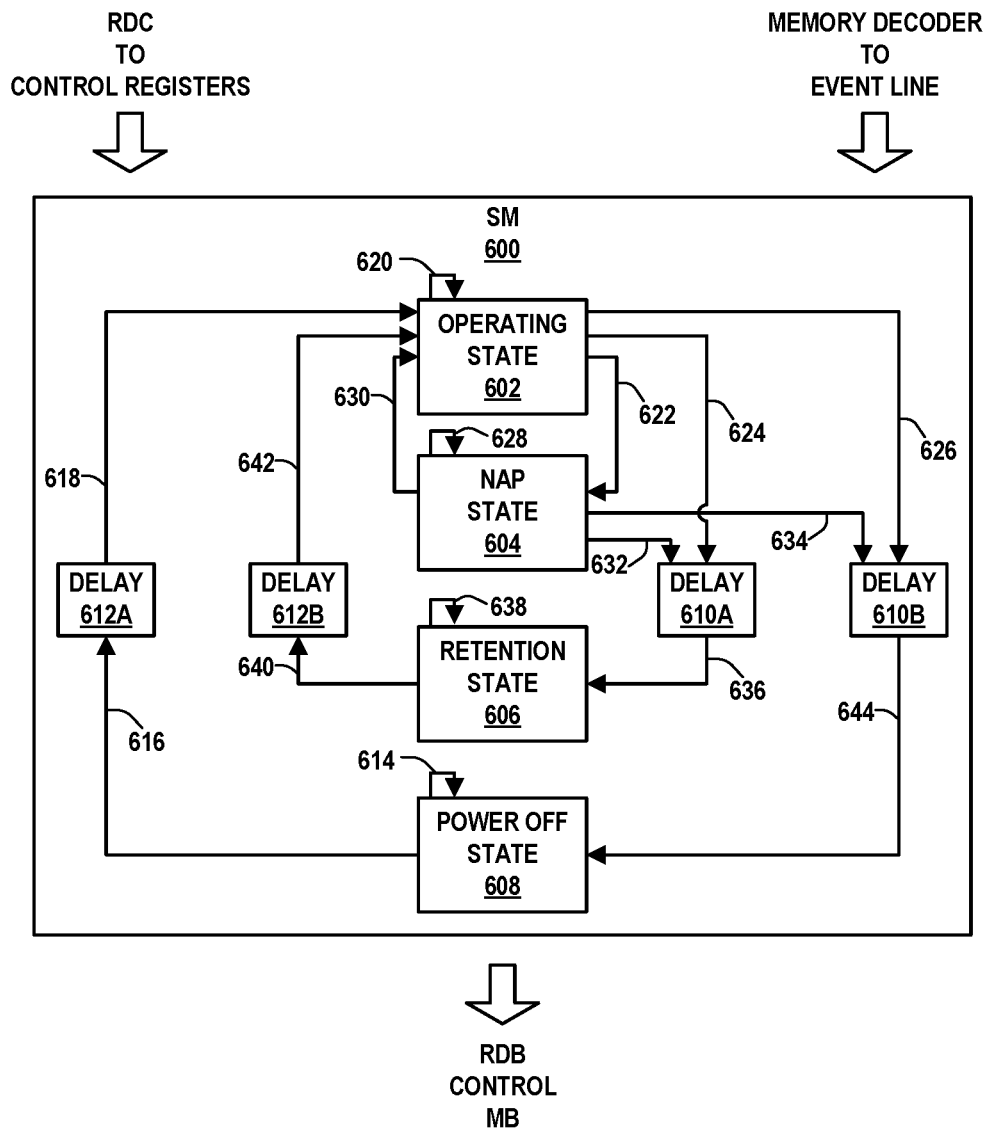
FIGS. 6A, 6B, and 6C are block diagrams of example state machines of a memory block controller in the hierarchical power management system, in accordance with techniques described in this disclosure.
Figure 6B:
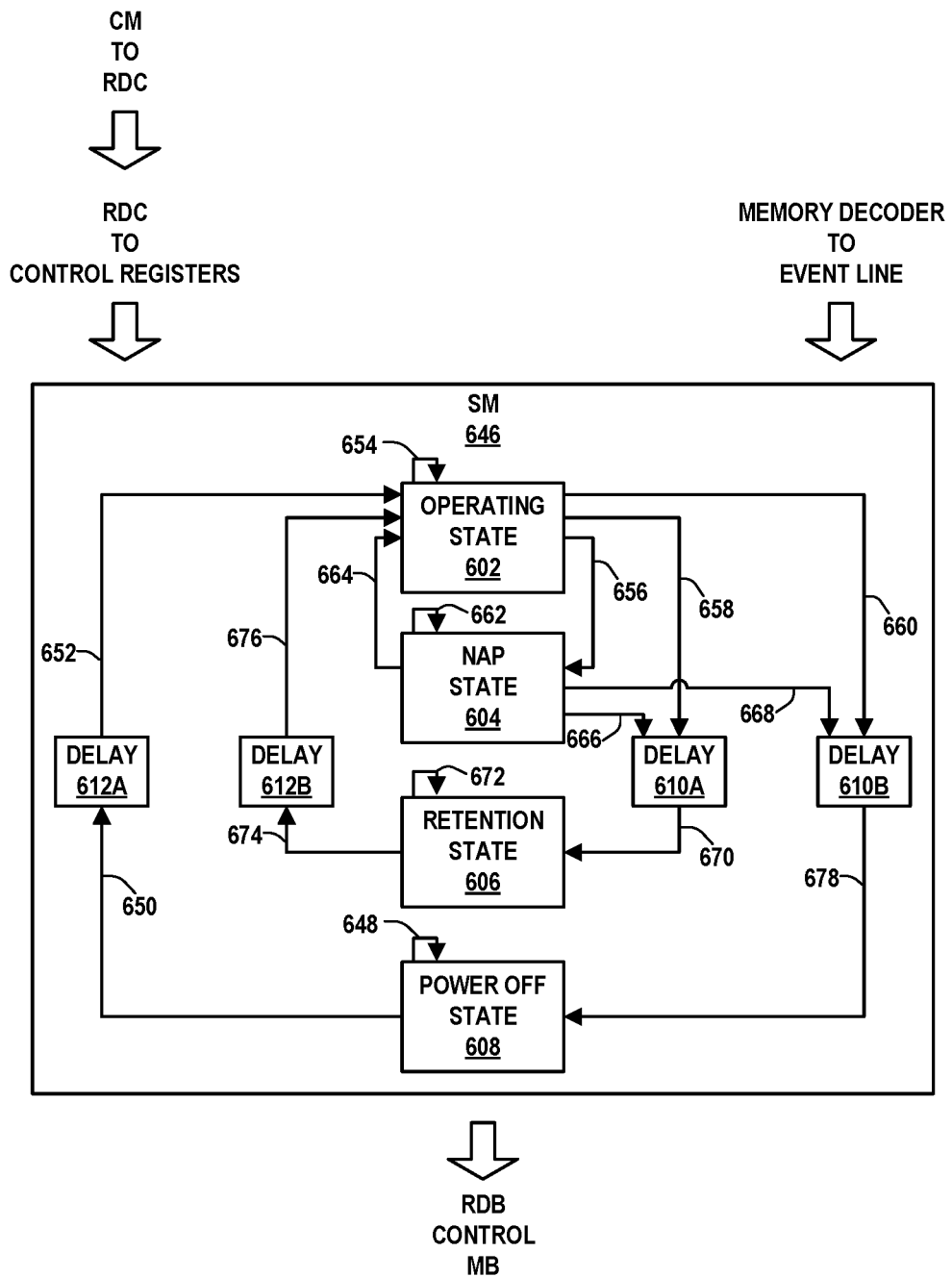
Figure 6C:
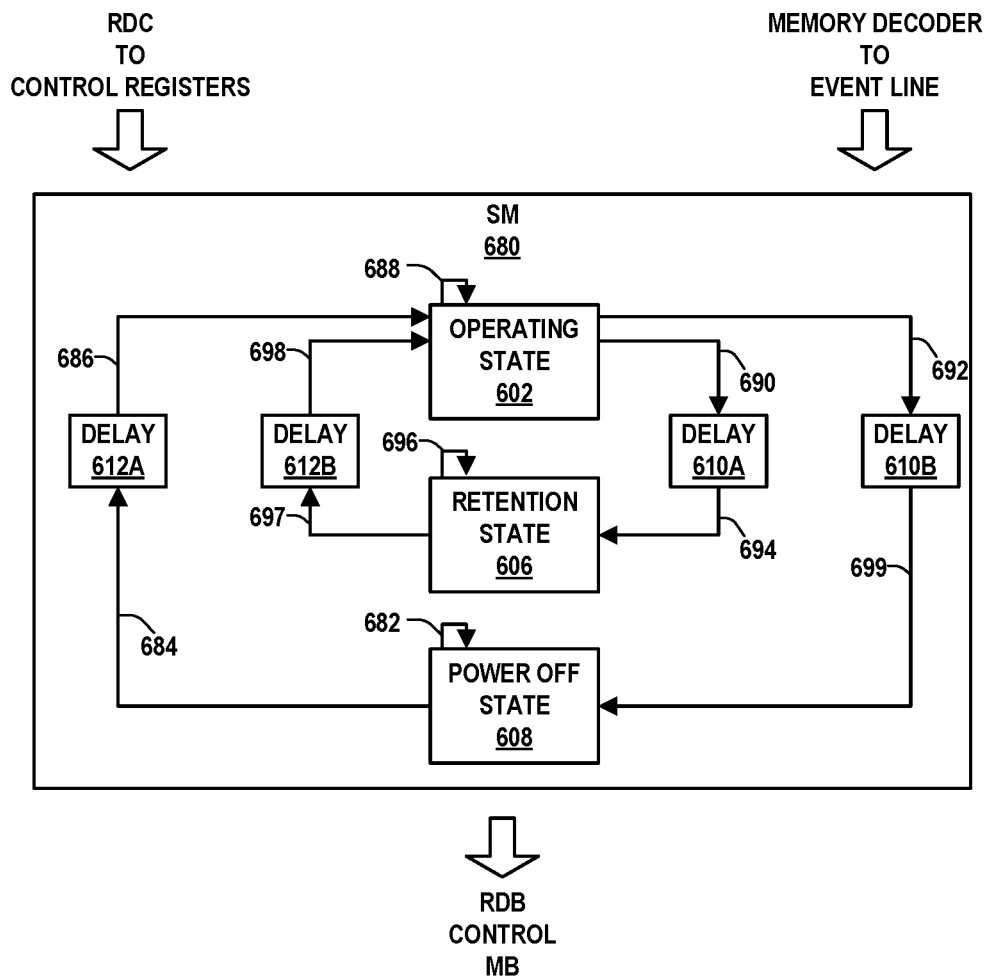

FIGS. 6A, 6B, and 6C are block diagrams of examples of state machine 508. FIG. 6A illustrates state machine 600 that transitions between states based on hardware control from memory decoder 320 (e.g., via event line 506) and software control from RDC 326 (e.g., via control registers 502). State machine 600 is an example of state machine 508. In the illustrated example, the state machine 600 includes an operating (OPR) state 602, a nap (NAP) state 604, a retention (REN) state 606, and a power off (PSO) state 608. Additionally, in the illustrated example, state machine 600 includes intermediate delay states 610A and 610B and 612A and 612B that state machine 600 transitions through as state machine 600 transitions between a high power state (e.g., OPR state 602, etc.) and a low power state (e.g., NAP state 604, REN state 606, and PSO state 608, etc.). In some examples, state machine 600 may transition from one low power state (e.g., NAP state 604, etc.) to another lower power state (e.g., REN state 606, and PSO state 608, etc.) without transitioning to a high power state (e.g., OPR state 602, etc.).

State machine 600 may start in PSO state 608. For example, when the mixed reality system is powered on, state machine 600 may default to PSO state 608. State machine 600 remains at PSO state 608 when, a PSO control register (e.g., one of control registers 502) is enabled (614). State machine 600 transitions to delay state 612A when an event is detected. An event may be detected via control registers 502 (e.g., via an OPR register, a REN register, etc.), event input 506, and/or software register 514 (616).

State machine 600 remains in delay state 612A for a threshold number of clock cycles (e.g., 8, 16, 24, 32, 40, 48, 56, 64 clock cycles, etc.). The number of clock cycles may be configured by RDC 326 (via a PSO-OPR transition timer control register of control registers 502). After the threshold number of cycles, state machine 600 transitions to OPR state 602 (618).

State machine 600 remains in OPR state 602 while (a) the OPR register 502 is enabled or (b) an enable signal is active on event input 506 (620). State machine 600 transitions to a different state depending on the content of the control registers 502 when the OPR register 502 is disabled and (b) the enable signal is not active on event input 506. State machine 600 transitions to NAP state 604 when a NAP register is enabled and the REN register and the PSO register are not enabled (622). State machine 600 transitions to delay state 610A when a REN register is enabled and the PSO register is not enabled (624). State machine 600 transitions to delay state 610B when a PSO register is enabled (626).

State machine 600 remains in NAP state 604 when the NAP register is enabled, and no other transition criteria is met (628). State machine 600 transitions to OPR state 602 when an event is detected (630). State machine 600 transitions to delay state 610A when the REN register is enabled and the PSO register is disabled (632). State machine 600 transitions to delay state 610B when the PSO register is enabled (634).

State machine 600 remains in delay state 610A for a threshold number of clock cycles (e.g., 8, 16, 24, 32, 40, 48, 56, 64 clock cycles, etc.). The number of clock cycles may be configured by RDC 326 (via a REN transition timer control register of control registers 502). After the threshold number of cycles, state machine 600 transitions to REN state 606 (636).

State machine 600 remains in REN state 606 when the REN register is enabled, and no other transition criteria is met (638). State machine 600 transitions to delay state 612B when an event is detected (640).

State machine 600 remains in delay state 612B for a threshold number of clock cycles (e.g., 8, 16, 24, 32, 40, 48, 56, 64 clock cycles, etc.). The number of clock cycles may be configured by RDC 326 (via a REN-OPR transition timer control register of control registers 502). After the threshold number of cycles, state machine 600 transitions to OPR state 602 (642).

State machine 600 remains in delay state 610B for a threshold number of clock cycles (e.g., 8, 16, 24, 32, 40, 48, 56, 64 clock cycles, etc.). The number of clock cycles may be configured by RDC 326 (via a PSO transition timer control register of control registers 502). After the threshold number of cycles, state machine 600 transitions to PSO state 608 (644).

In example scenario, when the mixed reality system is powered up, to prepare memory 318, RDC 326 may enable the OPR register and the REN register, causing state machine 600 to transition to delay state 612A. During the delay, RDC 326 may disable the OPR register. State machine transitions to OPR state 602. Because OPR state is disabled and REN state is enabled, state machine 600 transitions to delay state 610A. After the delay, state machine 600 transitions to REN state 606.

FIG. 6B illustrates state machine 646 that transitions between states based on hardware control from memory decoder 320 (e.g., via event line 506), software control from RDC 326 (e.g., via control registers 502), software control via software control line 514, and CM 404. CM 404 may instruct RDC 326 to transitions the state of state machine 646 in accordance with a SoC power management policy to turn on or turn off various subsystems and other components of the SoC. For example, CM 404 may, in response to an input from a user, direct certain memory bocks 322A-322N to be powered on to provide a sufficient amount of memory to react to the input. State machine 646 is an example of state machine 508. CM 404 may direct control of RDBs 328, via RCS 326, to implement a power control policy for the SoC that includes, for example, memory 318, memory decoder 320, CPU 406, and GPU 408, etc. In the example illustrated in FIG. 6B, the state machine 646 includes OPR state 602, NAP state 604, REN state 606, and PSO state 608. Additionally, in the illustrated example, state machine 646 includes intermediate delay states 610A and 610B and 612A and 612B that state machine 646 transitions through as state machine 600 transitions between a high power state (e.g., OPR state 602, etc.) and a low power state (e.g., NAP state 604, REN state 606, and PSO state 608, etc.). In some examples, state machine 646 may transition from one low power state (e.g., NAP state 604, etc.) to another lower power state (e.g., REN state 606, and PSO state 608, etc.) without transitioning to a high power state (e.g., OPR state 602, etc.). State machine 646 receives input via control registers 502 (e.g., including CM-associated registers, etc.) and event input 506.

State machine 646 may start in PSO state 608. For example, when the mixed reality system is powered on, state machine 600 may default to PSO state 608. State machine 646 remains at PSO state 608 when, the PSO control register is enabled (648). State machine 646 transitions to delay state 612A when an event is detected. An event may be detected via control registers 502 (e.g., via an OPR register, a REN register, etc.), event input 506, and/or software register 514 (650).

State machine 646 remains in delay state 612A for a threshold number of clock cycles (e.g., 8, 16, 24, 32, 40, 48, 56, 64 clock cycles, etc.). The number of clock cycles may be configured by RDC 326 (via a PSO transition timer control register of control registers 502). After the threshold number of cycles, state machine 646 transitions to OPR state 602 (652).

State machine 646 remains in OPR state 602 while (a) the OPR register 502 is enabled or (b) an enable signal is received on event input 506 (654). State machine 646 transitions to a different state depending on the content of the control registers 502 when the OPR register 502 is disabled and (b) the enable signal is not received on event input 506. State machine 600 transitions to NAP state 604 when a NAP register or CM-NAP register is enabled and the REN register and the PSO register are not enabled (656). State machine 646 transitions to delay state 610A when a REN register or CM-REN register is enabled and the PSO register is not enabled (658). State machine 646 transitions to delay state 610B when a PSO register is enabled (660).

State machine 646 remains in NAP state 604 when the NAP register is enabled, and no other transition criteria is met (662). State machine 646 transitions to OPR state 602 when an event is detected (664). State machine 600 transitions to delay state 610A when the REN register or CM-REN register are enabled and the PSO register and CM-PSO registers are disabled (666). State machine 646 transitions to delay state 610B when the PSO register or CM-PSO register are enabled (668).

State machine 646 remains in delay state 610A for a threshold number of clock cycles (e.g., 8, 16, 24, 32, 40, 48, 56, 64 clock cycles, etc.). The number of clock cycles may be configured by RDC 326 (via a REN transition timer control register of control registers 502). After the threshold number of cycles, state machine 646 transitions to REN state 606 (670).

State machine 646 remains in REN state 606 when the REN register is enabled, and no other transition criteria is met (638). State machine 646 transitions to delay state 612B when an event is detected (674).

State machine 646 remains in delay state 612B for a threshold number of clock cycles (e.g., 8, 16, 24, 32, 40, 48, 56, 64 clock cycles, etc.). The number of clock cycles may be configured by RDC 326 (via an OPR transition timer control register of control registers 502). After the threshold number of cycles, state machine 646 transitions to OPR state 602 (676).

State machine 646 remains in delay state 610B for a threshold number of clock cycles (e.g., 8, 16, 24, 32, 40, 48, 56, 64 clock cycles, etc.). The number of clock cycles may be configured by RDC 326 (via a REN transition timer control register of control registers 502). After the threshold number of cycles, state machine 646 transitions to PSO state 608 (678).

State machine 680 of FIG. 6C is an example of state machine 508. In the example illustrated in FIG. 6C, the state machine 680 includes OPR state 602, REN state 606, and PSO state 608. Additionally, in the illustrated example, state machine 680 includes intermediate delay states 610A and 610B and 612A and 612B that state machine 680 transitions through as state machine 680 transitions between a high power state (e.g., OPR state 602, etc.) and a low power state (e.g., NAP state 604, REN state 606, and PSO state 608, etc.). In some examples, state machine 680 may transition from one low power state (e.g., NAP state 604, etc.) to another lower power state (e.g., REN state 606, and PSO state 608, etc.) without transitioning to a high power state (e.g., OPR state 602, etc.). State machine 680 receives input via control registers 502 and event input 506.

State machine 680 may start in PSO state 608. For example, when the mixed reality system is powered on, state machine 600 may default to PSO state 608. State machine 600 remains at PSO state 608 when an event is detected. An event may be detected via control registers 502 (e.g., via an OPR register, a REN register, etc.), event input 506, and/or software register 514 (684).

State machine 680 remains in delay state 612A for a threshold number of clock cycles (e.g., 8, 16, 24, 32, 40, 48, 56, 64 clock cycles, etc.). The number of clock cycles may be configured by RDC 326 (via a PSO-OPR transition timer control register of control registers 502). After the threshold number of cycles, state machine 680 transitions to OPR state 602 (686).

State machine 680 remains in OPR state 602 while (a) the OPR register 502 is enabled or (b) an enable signal is received on event input 506 (688). State machine 600 transitions to a different state depending on the content of the control registers 502 when the OPR register 502 is disabled and (b) the enable signal is not received on event input 506. State machine 680 transitions to delay state 610A when a REN register is enabled and the PSO register is not enabled (690). State machine 600 transitions to delay state 610B when a PSO register is enabled (692).

State machine 680 remains in delay state 610A for a threshold number of clock cycles (e.g., 8, 16, 24, 32, 40, 48, 56, 64 clock cycles, etc.). The number of clock cycles may be configured by RDC 326 (via a REN transition timer control register of control registers 502). After the threshold number of cycles, state machine 600 transitions to REN state 606 (694).

State machine 680 remains in REN state 606 when the REN register is enabled, and no other transition criteria is met (696). State machine 680 transitions to delay state 612B when an event is detected (697).

State machine 680 remains in delay state 612B for a threshold number of clock cycles (e.g., 8, 16, 24, 32, 40, 48, 56, 64 clock cycles, etc.). The number of clock cycles may be configured by RDC 326 (via a REN-OPR transition timer control register of control registers 502). After the threshold number of cycles, state machine 600 transitions to OPR state 602 (698).

State machine 600 remains in delay state 610B for a threshold number of clock cycles (e.g., 8, 16, 24, 32, 40, 48, 56, 64 clock cycles, etc.). The number of clock cycles may be configured by RDC 326 (via a PSO transition timer control register of control registers 502). After the threshold number of cycles, state machine 680 transitions to PSO state 608 (699).

Figure 7:
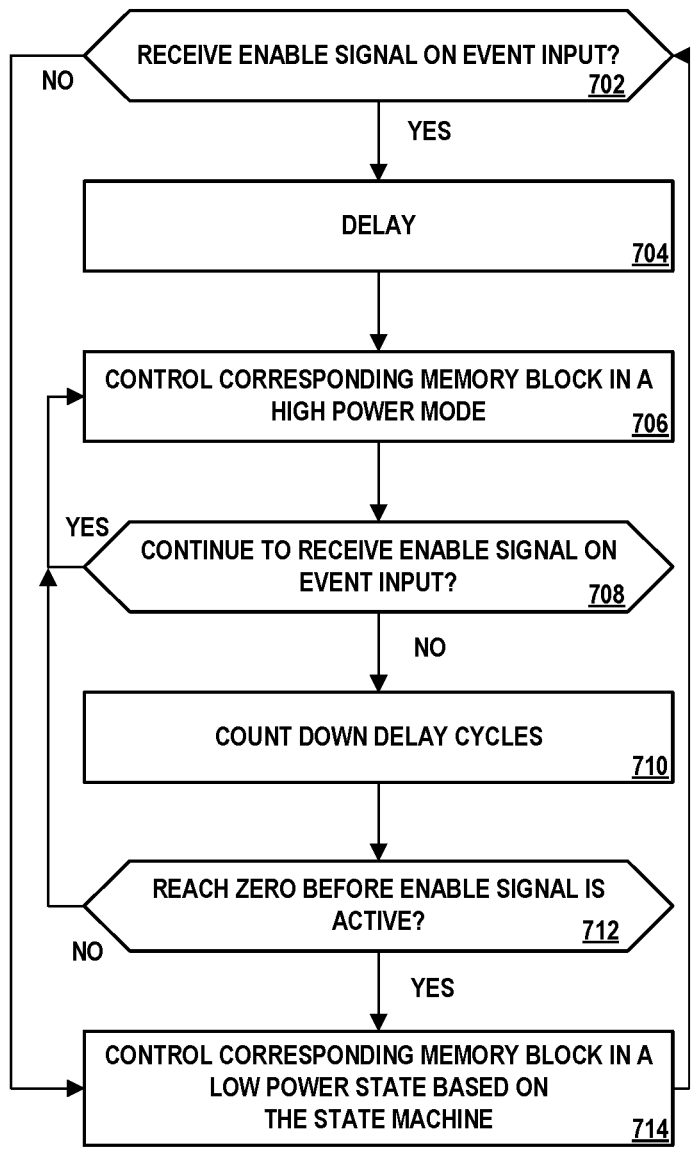
FIG. 7 is a flowchart of an example mode of operation to control power states of memory blocks, in accordance with techniques described in this disclosure.

FIG. 7 is a flowchart of an example mode of operation to control power states of memory blocks 322A-322N using hardware control, in accordance with techniques described in this disclosure. The mode of operation is described with respect to RDB 328A and memory block 322A for example purposes. Initially, the RDB 328A receives an enable signal from a memory decoder (e.g., memory decoder 320 of FIGS. 3 and 4) (702). The enable signal may be a voltage level associated with a logical true or enable (e.g., 3.3V in a 3.3V system). The memory decoder may generate the enable signal when a memory address associated with the memory block 322A is accessed by a subsystem of the SoC. Before state machine 508 transitions to a high power state (e.g., the OPR 602 of FIGS. 6A, 6B, and 6C) (YES at 702), the state machine 508 transitions to an intermediate delay state (e.g., the intermediate delay state 612A and 612B of FIGS. 6A, 6B, and 6C) for a threshold number of clock cycles of the clock driving the memory block 322 (704).

RDB 328A controls memory block 322A to an operating power mode (706). In some examples, RDB 328A provides a supply voltage and clock frequency to enable reading from and writing to memory block 322A. RDB 328A waits until it is no longer receiving the enable signal on event input 506 (708). When RDB 328A is receiving the enable signal, (YES at 708), RDB 328A continues to operate memory block 322A in an operating mode suitable to read from and write to memory (706). When RDB 328A is no longer receiving the enable signal (NO at 708), the state machine 508 counts down a number clock cycles of the clock driving the memory block 322 (710). When the countdown reaches zero before the signal on event input 506 is active again (YES at 712), RDB 328A controls memory block 322A according to the state of state machine 508. For example, RDC 326 may, via control registers 502, indicate state machine 508 is to transition to REN state 606 when the enable signal is no longer present on event line 506 (714). RDB 32A8 then waits for another enable signal on event line 506 (702). When the countdown does not reach zero before the signal on event input 506 is active again (NO at 712), RDB 328A controls memory block 322A to an operating power mode (706).

Figure 8:
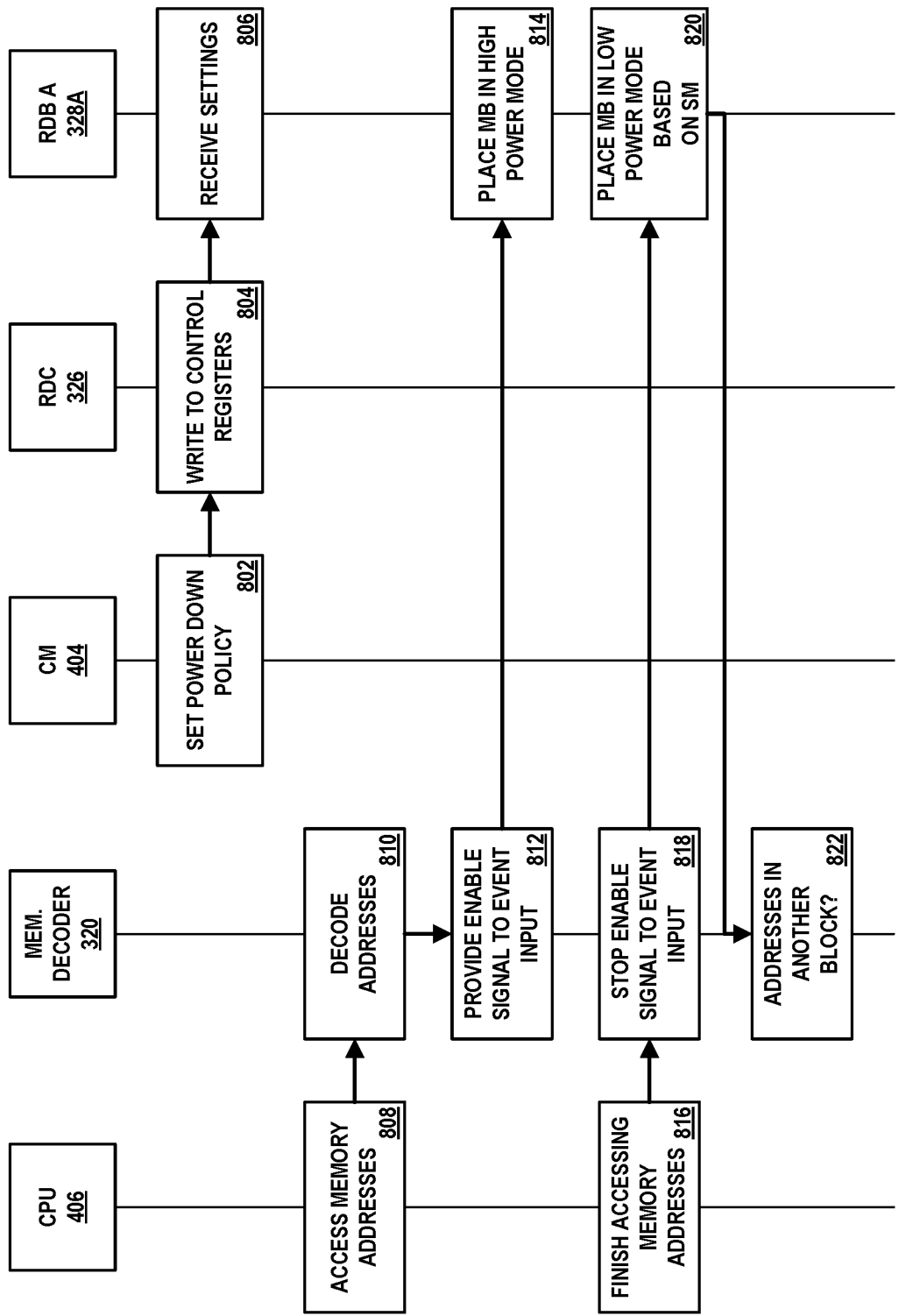
FIG. 8 is a flowchart of an example mode of operation to access memory that is being controlled by the hierarchical power management system, in accordance with techniques described in this disclosure.

FIG. 8 is a flowchart of an example mode of operation to access memory 312 that is being controlled by the hierarchical power management system, in accordance with techniques described in this disclosure. The mode of operation is described with respect to RDB 328A and memory block 322A for example purposes. Initially, cluster manager 404 sets power down policy to RDC 326 controlling a memory segment (e.g., memory segments 402 of FIG. 4) (802). RDC 326 sets control registers 503 of RDB 328A to implement the power down policy (804). The RDBs communicatively coupled to RDC 326 (e.g., RDB 328A) receive the control register settings (806).

Later, CPU 406 requests to access one or more memory addresses (808). Memory decoder 320 decodes the address to determine which memory block (e.g., memory block 322A) is associated with the memory addresses requested by CPU 406 (810). In the case where the memory address is associated with memory block 322A, memory decoder 320 applies an enable signal to event input 506 of RDB 328A (812). State machine 508 of RDB 328A transitions, directly or indirectly, to an OPR state to provide power to memory block 322A (814).

CPU 406 may access several memory addresses within memory block 322A. CPU 406 eventually finishes accessing memory address of memory block 322 (816). Memory decoder 320 stops providing the enable signal to event input 506 (818). RDB 328A controls power to memory block 322A according to the power state of state machine 508. The low power state that the state machine 508 transitions to is based on the power down policy set by CM 404 and implemented by RDC 326 (e.g., by setting control registers 502) (820). Because memory addresses are often read sequentially and may start with one memory block and proceed to a next memory block memory decoder 320 continues to decode memory addresses and provide an enable signal to event lines 506 of corresponding RDCs 328 (822).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random-access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. An artificial reality system comprising:
a device comprising one of a peripheral device configured to generate artificial reality content for display or a head-mounted display unit (HMD) configured to output artificial reality content for display, the device comprising:
   a memory divided into a plurality of memory blocks, each memory block configured to operate in a plurality of power modes independently of each other memory block;
   a memory decoder connected to each of the memory blocks, wherein the memory decoder:
      receives a request to access a memory address;
      determines a memory block included in the plurality of memory blocks to which the memory address corresponds; and
      provides an enable signal for an event input of the memory block due at least in part to the memory address corresponding to the memory block;
   a memory block controller connected to the memory block and the memory decoder, wherein the memory block controller:
      includes a control register that defines a state machine that controls a power state of the memory block; and
      receives the enable signal for the event input of the memory block, the enable signal causing the power state of the memory block to transition based at least in part on the state machine; and
   a memory power controller connected to the memory block controller, wherein the memory power controller configures the state machine via the control register such that, when the memory block controller receives the enable signal, the power state of the memory block controller transitions from a lower power mode included in the plurality of power modes to a higher power mode included in the plurality of power modes to facilitate accessing the memory address in connection with the request, wherein:
      the memory decoder stops providing the enable signal for the event input of the memory block; and
      the memory block controller causes the power state of the memory block to return from the higher power mode to the lower power mode due at least in part to the memory decoder having stopped providing the enable signal for the event input of the memory block.

2. The system of claim 1, wherein the memory power controller configures the state machine via the control register by selecting the lower power mode as a default setting such that the power state of the memory block applies the lower power mode unless the memory block controller receives the enable signal for the event input of the memory block.

3. The system of claim 1, wherein:
the state machine comprises a plurality of states each corresponding to one of the plurality of power modes; and
the memory block controller controls the power state of the memory block based on a current state of the state machine as configured by the memory power controller.

4. The system of claim 1, wherein:
the state machine causes the memory block controller to transition between the power modes based on values of the control register; and
the memory power controller provides software control of the power modes for the memory block.

5. The system of claim 1, wherein the memory decoder is configured to:
decode the memory address to determine the memory block associated with the memory address; and
direct the memory block controller via the enable signal to transition the power state of the memory block to the higher power mode in accordance with the state machine.

6. The system of claim 1, wherein the device further comprises a system on chip with multiple subsystems that share the memory.

7. The system of claim 1, further comprising a plurality of memory block controllers connected to the plurality of memory blocks, the plurality of memory block controllers including the memory block controller connected to the memory block; and
wherein the memory power controller is further configured to provide software control of power states of the memory blocks by directing the memory block controllers to power the memory blocks based at least in part on control registers included in the memory block controllers and event inputs of the memory blocks.

8. The system of claim 1, wherein the memory block controller is configured to provide hardware control of the memory block by powering the memory block to facilitate access to the memory address in response to receiving the enable signal from the memory decoder.

9. The system of claim 8, wherein the memory block controller provides hardware control of the memory block independent of software control provided by the memory power controller.

10. A method for hierarchical power control of memory in an artificial reality system, the artificial reality system including a processor and memory, the memory including a memory decoder and a plurality of memory blocks, the plurality of memory blocks including a first memory block and a second memory block, the method comprising:
receiving, by the memory decoder, a request from the processor to access a memory address;
determining, by the memory decoder, a memory block included in the plurality of memory blocks to which the memory address corresponds;
providing, by the memory decoder, an enable signal for an event input of the memory block due at least in part to the memory address corresponding to the memory block;
defining, by a control register included in a memory block controller, a state machine that controls a power state of the memory block;
receiving, by the memory block controller, the enable signal for the event input of the memory block, the enable signal causing the power state of the memory block to transition based at least in part on the state machine;
configuring, by a memory power controller, the state machine via the control register such that, when the memory block controller receives the enable signal, the power state of the memory block controller transitions from a lower power mode to a higher power mode to facilitate accessing the memory address in connection with the request;
stopping to provide, by the memory decoder, the enable signal for the event input of the memory block; and
causing, by the memory block controller, the power state of the memory block to return from the higher power mode to the lower power mode due at least in part to the memory decoder having stopped providing the enable signal for the event input of the memory block.

11. The method of claim 10, wherein configuring the state machine via the control register comprises configuring the state machine by selecting the lower power mode as a default setting such that the power state of the memory block applies the lower power mode unless the memory block controller receives the enable signal for the event input of the memory block.

12. The method of claim 10, further comprising:
controlling, by the memory block controller, the power state of the memory block based on a current state of the state machine as configured by the memory power controller.

13. The method of claim 12, further comprising:
stopping, by the memory decoder, the enable signal for the event input of the memory block; and
causing, by the memory block controller, the power state of the memory block to return from the higher power mode to the lower power mode due at least in part to the memory decoder having stopped the enable signal for the event input of the memory block.

14. The method of claim 10, further comprising:
providing, by the memory power controller, software control of the power state of the memory block by directing the memory block controller, via the control register, to power the memory block based at least in part on the control register included in the memory block controller and the event input of the memory block.

15. The method of claim 10, further comprising:
providing, by the memory block controller, hardware control of the memory block by powering the memory block to facilitate access to the memory address in response to receiving the enable signal from the memory decoder.

16. A non-transitory computer readable storage medium comprising instructions that, when executed, cause a memory power management system of an artificial reality system to:
receive, by a memory decoder, a request from a processor to access a memory address;
determine, by the memory decoder, a memory block to which the memory address corresponds among a plurality of memory blocks;
provide, by the memory decoder, an enable signal for an event input of the memory block due at least in part to the memory address corresponding to the memory block;
define, by a control register included in a memory block controller, a state machine that controls a power state of the memory block;
receive, by the memory block controller, the enable signal for the event input of the memory block, the enable signal causing the power state of the memory block to transition based at least in part on the state machine;
configure, by a memory power controller, the state machine via the control register such that, when the memory block controller receives the enable signal, the power state of the memory block controller transitions from a lower power mode to a higher power mode to facilitate accessing the memory address in connection with the request;
stop providing, by the memory decoder, the enable signal for the event input of the memory block; and
cause, by the memory block controller, the power state of the memory block to return from the higher power mode to the lower power mode due at least in part to the memory decoder having stopped providing the enable signal for the event input of the memory block.

* * * * *